United States Patent [19]

Kanegae et al.

[11] Patent Number: 4,502,446

[45] Date of Patent: Mar. 5, 1985

[54] FAIL-SAFE SYSTEM FOR AUTOMOTIVE ENGINE CONTROL SYSTEM FOR FAIL-SAFE OPERATION AS CRANK ANGLE SENSOR FAILS OPERATION THEREOF AND FAIL-SAFE METHOD THEREFOR, AND DETECTION OF FAULT IN CRANK ANGLE SENSOR

[75] Inventors: Hidetoshi Kanegae, Tokyo; Katsunori Oshiage, Yokosuka; Akito Yamamoto; Akio Hosaka, both of Yokohama, all of Japan

[73] Assignee: Nissan Motor Company, Limited, Yokohama, Japan

[21] Appl. No.: 428,059

[22] Filed: Sep. 29, 1982

[30] Foreign Application Priority Data

Dec. 10, 1981 [JP] Japan .................................. 56-197720
Apr. 7, 1982 [JP] Japan .................................. 57-57667
May 11, 1982 [JP] Japan .................................. 57-67510
May 13, 1982 [JP] Japan .................................. 57-79227
May 13, 1982 [JP] Japan .................................. 57-79228

[51] Int. Cl.³ .............................................. F02B 3/00
[52] U.S. Cl. ...................................... 123/479; 123/494
[58] Field of Search ..................... 123/479, 490, 494

[56] References Cited

U.S. PATENT DOCUMENTS 3,834,361 9/1974 Keely .................................. 123/479
4,207,851 6/1980 Crisefi ................................. 123/479
4,245,315 1/1981 Barman et al. ...................... 123/479
4,255,789 3/1981 Hartford et al. ..................... 123/479
4,370,962 2/1983 Hosaka ................................ 123/479

FOREIGN PATENT DOCUMENTS 2945543 5/1981 Fed. Rep. of Germany ...... 123/479
2037009 7/1980 United Kingdom ................ 123/479
2072883 10/1981 United Kingdom ................ 123/479

Primary Examiner—Ronald B. Cox
Attorney, Agent, or Firm—Schwartz, Jeffery, Schwaab, Mack, Blumenthal & Koch

[57] ABSTRACT

A fail-safe system for an engine control system is capable of performing a fail-safe operation when a crank angle sensor fails. When the crank angle sensor malfunctions, at least one of a crank reference signal and a crank position signal will be absent. The fail-safe system prevents the engine from stalling even when one of the crank reference signal and the crank position signal is absent. The fail-safe operation will be carried out when the absence of the crank reference signal and/or the crank position signal is detected. In the fail-safe operation, a fail-safe signal is produced for controlling engine operation as a replacement for an engine control signal from the engine control system under normal conditions. The signal value of the fail-safe signal may be variable in accordance with an engine operating condition derived from an engine control parameter other than the crank angle sensor signals.

56 Claims, 47 Drawing Figures

FIG.3
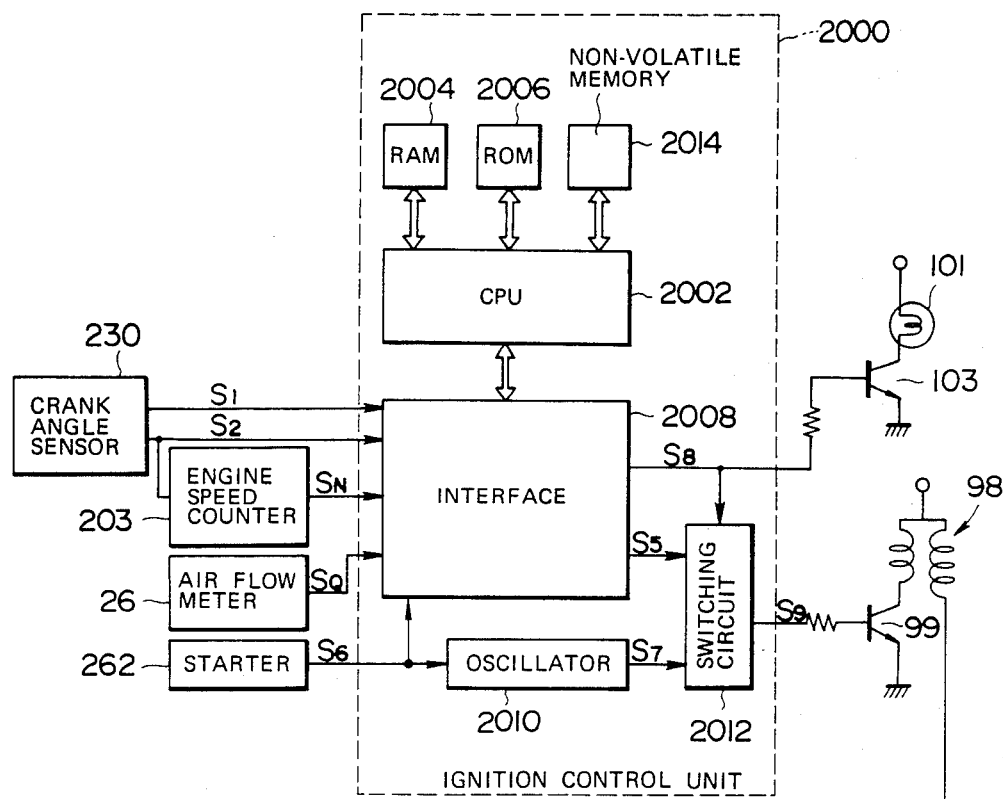
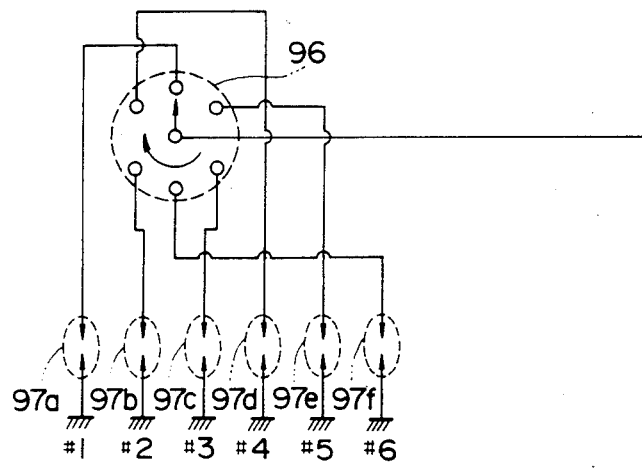

FIG.20
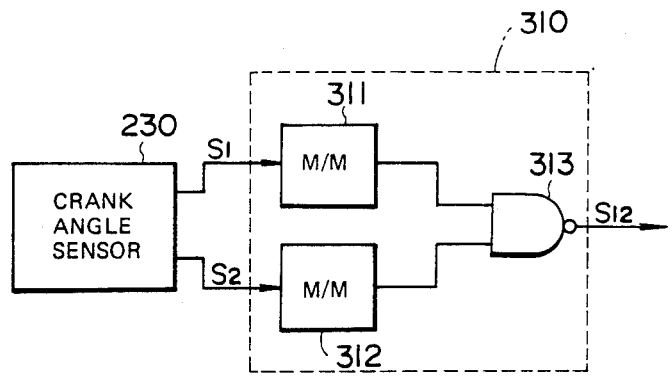
FIG.21
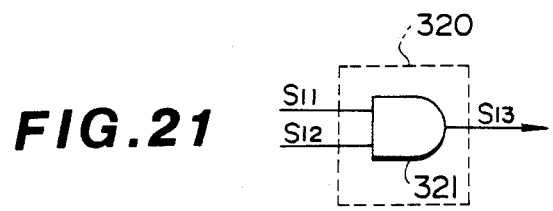
FIG.22
| | $S_{11}=0$ | $S_{11}=1$ |
|---|---|---|
| $S_{12}=0$ | $S_{13}=0$ | $S_{13}=0$ |
| $S_{12}=1$ | $S_{13}=0$ | $S_{13}=1$ <ABNORMAL> |

VOLTAGE-CONTROLLED OSCILLATOR

FAIL-SAFE SYSTEM FOR AUTOMOTIVE ENGINE CONTROL SYSTEM FOR FAIL-SAFE OPERATION AS CRANK ANGLE SENSOR FAILS OPERATION THEREOF AND FAIL-SAFE METHOD THEREFOR, AND DETECTION OF FAULT IN CRANK ANGLE SENSOR

BACKGROUND OF THE INVENTION

The present invention relates generally to an automotive engine control system for controlling engine operation such as an ignition timing control, or fuel injection control. More particularly, the invention relates to a fail-safe system in the automotive engine control system for back-up of a crank angle sensor which serves as a control parameter signal generator for the engine control by producing a signal representative of an engine revolution parameter.

In an automotive engine control system, the engine revolution parameter is one of the most important parameters of the control process. For example, in spark ignition control, spark ignition timing and spark advance angle are determined mainly on the basis of the engine revolution parameter. Similarly, in fuel injection control, fuel injection timing is determined in synchronism with engine revolution. As is per se well known, engine revolution is detected by a crank angle sensor attached to an engine crank shaft for rotation therewith. Generally, the crank angle sensor produces a crank reference angle signal at predetermined angular positions of the crank shaft, for example every 120° or 90° and a crank position signal when the crank shaft rotates through a given angle, e.g., 1° or 2°. On the basis of the crank reference signal, and the crank shaft angular position, the times at which a reciprocating piston is at top dead center (TDC) and bottom dead center (BDC) are detected. On the other hand, based on the crank position signal, the engine revolution speed (hereafter referred as "engine speed") is detected.

Since the spark ignition timing and spark advance angle are determined on the basis of the crank reference signal as set forth previously, the spark ignition control may malfunction if the crank angle sensor fails to produce the crank reference signal for some reason. This may result in stalling of engine due to the absence of ignition in the combustion chambers. Similarly, the fuel injection control may malfunction when the crank reference signal is absent. In this case, since the fuel injection amount in the fuel injection control is generally determined on the basis of the engine speed and an engine load condition which is represented by an intake air flow rate, intake vacuum pressure, or the like, the absence of the crank position signal, i.e. the absence of the engine speed parameter, may cause the fuel injection control system to fail to determine the fuel injection amount.

If the crank reference signal and crank position signal are outputted from the crank angle sensor but contains some error, the ignition control and fuel injection control may operate erroneously.

In order to detect fault in the engine control system, there have been developed various monitor systems for monitoring the control operation and/or sensor signals providing the control parameters. For example, U.K. Prepublication No. 2,035,633, published on June 18, 1980 discloses a malfunction preventing system for a microcomputer system, in which abnormal conditions during program execution are detected to produce an alarm signal and/or reset the system to an initial position thereof. In addition, in the U.K. Prepublication No. 2,046,964, published on Nov. 19, 1980, which has been patented in the United States under U.S. Pat. No. 4,339,801, on July 13, 1982, discloses an electronic control system for an automotive vehicle provided with a plurality of check programs for checking the system operation. Furthermore, Japanese Patent Prepublication No. 56-141534 published on Nov. 5, 1981 discloses a monitor system for an engine control system in which sensor signals and actuator operations are checked during execution of the checking operation.

Although various check or monitor systems have been provided and/or developed conventionally, these may not satisfactorily and successfully prevent the engine control system from stalling if the crank angle sensor ceases to produce the sensor signals or produces erroneous signals.

SUMMARY OF THE INVENTION

Therefore, it is an object of the present invention to provide an automotive engine control system which can back-up control operation if a crank angle sensor malfunctions.

Another and more specific object of the present invention is to provide a spark ignition control and/or fuel injection control which can perform their respective control operations in spite of crank angle sensor malfunction.

A further object of the present invention is to provide a method and device for detecting faults in the crank angle sensor by monitoring the crank angle sensor signals and initiating the back-up operation for the control system in response thereto as set forth previously.

According to the present invention, there is provided a fail-safe system for an engine control system for an internal combustion engine, such as an ignition control system or a fuel injection control system comprising a crank angle sensor for detecting engine revolution and producing a crank reference signal and a crank position signal respectively having frequencies proportional to engine revolution speed, a control unit receiving the crank reference signal and the crank position signal and producing a control signal for controlling engine operation on the basis of the crank reference signal, the crank position signal and at least one preselected control parameters, first means for detecting absence of at least one of crank reference signal and the crank position signal and producing a fault signal when the absence of one of the signals is detected and second means, responsive to the fault signal, for producing a fail-safe signal for controlling said engine operation as a replacement for said control signal. The second means produces a characteristic property (or value) of the fail-safe signal based on the preselected control parameter or parameters.

According to another aspect, a method for performing a fail-safe operation when the crank angle sensor fails to produce at least one of the crank reference signal and said crank postion signal, essentially comprises the steps of detecting the presence of the crank reference signal and the crank position signal and producing a fault signal when at least one of the signals is absent, producing a fail safe signal in response to the fault signal, and replacing a control signal, such as a spark ignition timing control signal, or a fuel injection control signal normally produced in the control unit with the fail-safe signal in order to perform temporary engine control under fail-safe condition.

According to a further aspect of the invention, a fault detection system for an crank angle sensor producing a crank reference signal and a crank position signal comprises a first detector detecting the presence of the crank reference signal and the crank position signal and producing a first signal when at least one of the signals is absent, a second detector for detecting an engine operating condition and producing a second signal when the engine is driven, and means for recognizing malfunction the crank angle sensor when the AND condition of the first and second signals is established.

BRIEF DESCRIPTION OF THE DRAWINGS

The present invention will be more fully understood from the detailed description given herebelow and from the accompanying drawings of the preferred embodiments of the present invention, which, however, should not be taken as limitative to the invention but for elucidation and explanation only.

In the drawings:

FIG. 3 is a block diagram of a spark ignition control system in which the first embodiment of the fail-safe system according to the present invention is included;

FIG. 20 is a circuit diagram of a signal generator in the fault detection circuit of FIG. 17;

FIG. 21 is a circuit diagram of a discriminator in the fault detection circuit of FIG. 17;

FIG. 22 shows a table for fault detection;

DESCRIPTION OF THE PREFERRED EMBODIMENT

Figure 1:
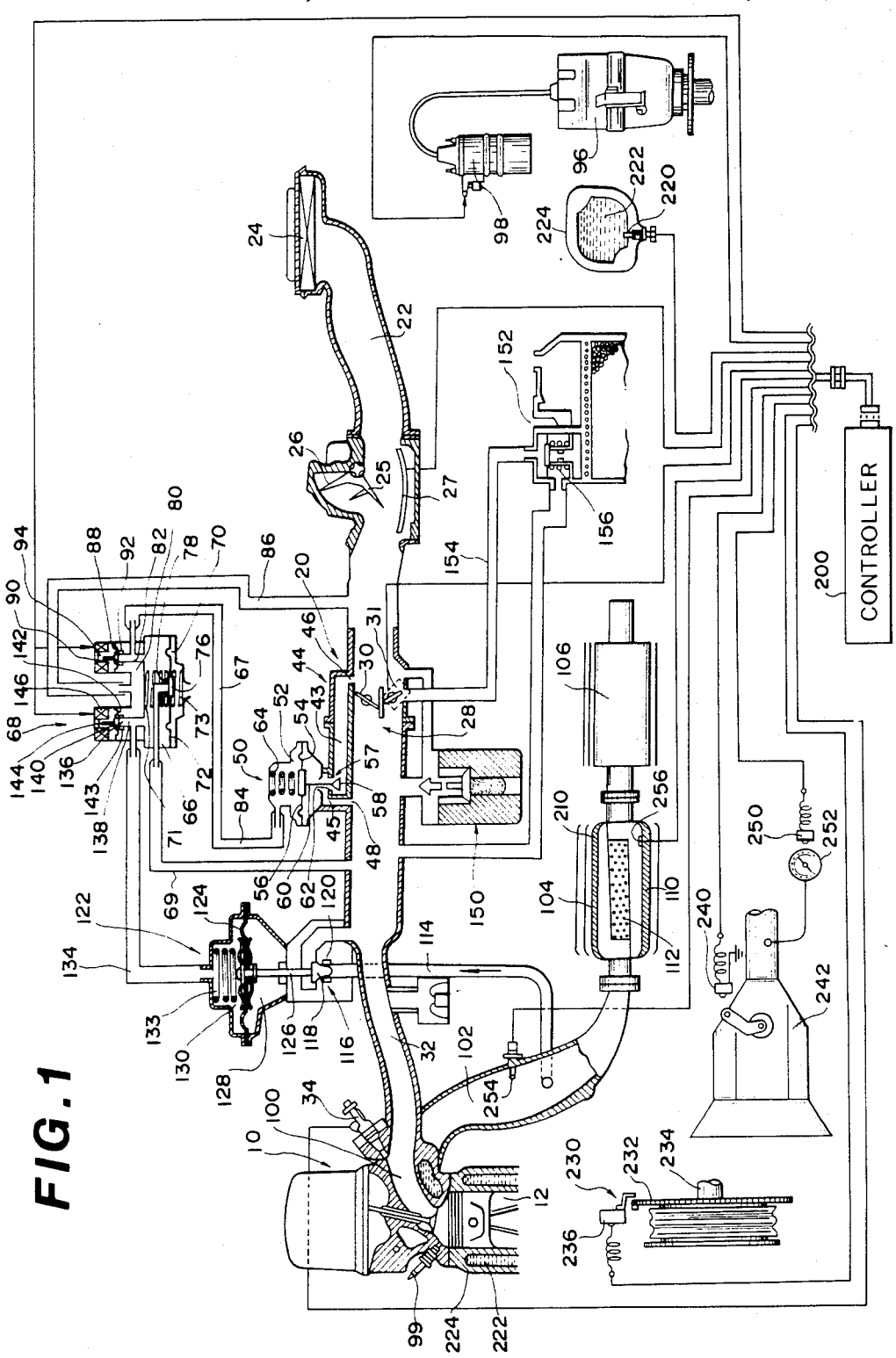
FIG. 1 is a diagram of the overall lay-out of an engine control system to which a fail-safe system according to the invention is applied.

Referring now to the drawings, and particularly to FIG. 1, in which is illustrated and shown the general construction of an internal combustion engine with an electronic control system for controlling the engine operation corresponding to various parameters, to be provided in an automotive vehicle. A control system according to the present invention is schematically shown in a form of diagram as applied to this internal combustion engine, as an example and for the purposes of explanation only, and should not be taken as limitative of the scope of the present invention to the control system applied to this specific engine. It should be appreciated that the system according to the present invention will be applicable to any type of internal combustion engine which can be controlled by a microcomputer mounted on the vehicle.

In FIG. 1, each of the engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intlake duct 22 to measure the amount of intake air flowing therethrough, a throttle chamber 28 in which is disposed a throttle valve 30 cooperatively coupled with an accelerator pedal (not shown) so as to adjust the rate of intake air flow therethrough, and an intake manifold 32 having a plurality of conduits not clearly shown in FIG. 1. The air flow meter 26 comprises a flap member 25 and a rheostat 27. The flap member 25 is pivotably supported within the air intake passage 20 so that it can be pivotted about its axis to a degree related to the intake air flow rate. Specifically, the flap member 25 is rotated clockwise in FIG. 1 in response to increase of the air flow rate. The rheostat 27 opposes the flap member 25 and generates an analog signal indicative of the air flow rate. The rheostat 27 is connected to an electric power source and its resistance value varies in accordance with the air flow rate. A throttle angle sensor 31 is connected to the throttle valve 30. The throttle angle sensor 31 comprises a full throttle switch, which is turned on in response to opening of the throttle valve beyond a given open angle and an idle switch which is turned on if the throttle valve open angle is less than a minimum value. The fuel injection amount through the fuel injector 34 is controlled by an electromagnetic actuator 35. The actuator is electrically operated by the other control system which determines fuel injection amount, fuel injection timing and so on in accordance with engine operating conditions determined on the basis of engine operation parameters such as engine load, engine speed and so on. It should be noted that, although the fuel injector 34 is disposed in the intake manifold 32 in the shown embodiment, it is possible to locate it in the combustion chamber 12 in a per se well known manner.

A bypass passage 44 is provided for the intake air passage 20. One end 46 of the bypass passage 44 opens between the air flow meter 26 and the throttle valve 30 and the other end 48 opens downstream of the throttle valve 30, adjacent to the intake manifold 32. Thus the bypass passage 44 bypasses the throttle valve 30 and connects the upstream side of the throttle valve 30 to the intake manifold 32. An idle control valve, generally designated by 50, is provided in the bypass passage 44.

The idle control valve 50 generally comprises two chambers 52 and 54 separated by a diaphragm 56. The bypass passage 44 is thus separated by the valve means 50 into two portions 43 and 45 respectively located upstream and downstream of the port 57 of the valve 50. The valve means 50 includes a poppet valve 58 disposed within the port 57 in a manner that it is movable between two position, one opening the valve to establish communication between the portions 43 and 45 of the passage 44 and the other closing the valve to prevent communication therebetween. The poppet valve 58 has a stem 60, the free end of which is secured to the diaphragm 56 so as to cooperatively move therewith. The diaphragm 56 is biased downwards in the drawing, so as to release the poppet valve 58 from a valve seat 62, by a helical compression coil spring 64 disposed within the chamber 52 of the valve means 50. Thereby, the valve 50 is normally opened, and normally connects the portions 43 and 45 of the bypass passage 44 to one another, via its valve port 57.

The chamber 54 of the idle control valve 50 is opened to the atmosphere to introduce atmospheric air thereinto. On the other hand, the chamber 52 of the idle control valve 50 communicates with a pressure regulating valve 68 acting as a control vacuum source through a vacuum passage 67. The pressure regulating valve 68 is separated generally into two chambers 66 and 70 by a diaphragm 72. The chamber 66 of the pressure regulating valve 68 also communicates with the downstream side of the throttle valve 30 through the vacuum passage 69 so as to introduce the intake vacuum. The chamber 70 is open to the atmosphere in a per se well known manner. To the diaphragm 72 is secured a valve member 76 which opposes a valve seat 78 provided at the end of the passage 69. In the chambers 66 and 70 there are respectively disposed helical compression springs 71 and 73. The springs 71 and 73 are generally of equal spring pressure in a position in which the diaphragm 72 is in the neutral position. It will be noted that the chamber 66 can also be connected to an exhaust-gas recirculation (EGR) control valve which recirculates some of the exhaust gas flowing through an exhaust passage and exhaust recirculation passage to the intake manifold 32.

The diaphragm 72 is moved upwards or downwards by the change of the balance between the vacuum in the chamber 66 and the atmospheric pressure introduced into the chamber 70. In accordance with the movement of the diaphragm 72, the valve member 76 is moved toward and away from the valve seat 78.

Another chamber 80 is also defined in the control valve 68, which chamber 80 communicates with the chamber 66 through a passage 82. The passage 82 is connected to the chamber 52 of the idle control valve 50 through a control vacuum passage 87. On the other hand, the chamber 80 also communicates with the air intake passage 20 upstream of the throttle valve 30 through a passage 86 so as to introduce atmospheric air. The chamber 80 is partitioned by a diaphragm 88 on which a magnetic valve member 90 is secured. The magnetic valve member 90 opposes a valve seat 92 formed at the end of the passage 82. Also, the magnetic valve member 90 opposes an electromagnetic actuator 94, the duty cycle of which is controlled by a control pulse signal generated by a controller 100. Depending on the amount of the atmospheric air introduced into the passage 82 from the chamber 80, which amount is determined by the duty cycle of the electromagnetic actuator 94, the control vacuum for controlling the opening degree of the valve member 58 of the idle control valve 50 is regulated and fed to the control valve through the control vacuum passage 67.

Spark ignition plug 99 are inserted into respective engine cylinders 12 to effect ignition at a controlled timing. The ignition plug 99 is connected to an ignition coil 98 which receives electrical power from a distributor 96.

An exhaust system for the engine exhaust gas comprises an exhaust manifold 100, an exhaust passage 102, an exhaust gas purifier 104, a silencer 106 and a exhaust nozzle 108. The exhaust manihold 100 opens toward the engine cylinders to draw engine exhaust gas therefrom. The exhaust passage 102 communicates with the exhaust manifold 100 in series and houses therein the exhaust gas purifier 104 and the silencer 106. In the shown embodiment, the exhaust gas purifier 104 comprises a purifier housing 110 and a three-way catalyst 112 disposed within the purifier housing 110. The three-way catalyst 112 oxidizes the monoxide carbon CO and hydrocarbon HC and reduces nitrogen oxide $NO_x$.

An exhaust gas recirculation passage 114, which will be referred to hereinafter as EGR passage is connected to the exhaust passage 102 upstream of the exhaust gas purifier 104. The EGR passage 114 communicates with the intake manifold 32 via an exhaust gas recirculation rate control valve 116 which will referred to hereinafter as EGR control valve. The EGR control valve 116 generally comprises a valve member 118 with a valve seat 120 which is provided at the end of the EGR passage 114 proximal to the intake manifold 32. The valve member 118 incorporates a vacuum actuator 122 and is cooperatively connected to a diaphragm 124 of the vacuum actuator 122 via a stem 126. The diaphragm 124 divides the interior of the vacuum actuator 122 into two chambers 128 and 130. The chamber 128 communicates with the EGR passage 114 via a passage 132 and the chamber 130 communicates with the regulating valve 68 via a control vacuum passage 134 and houses a set spring 133. The control vacuum passage 134 is joined to a passage 136 connecting the vacuum chamber 66 with a chamber 138. One end of the passage 136 faces a valve member 140 secured on a diaphragm 142. A valve seat 143 onto which the valve member 140 seats is provided at the end of passage 136. The valve member 140 has a stem portion 144 inserted within an electromagnetic actuator 146.

The duty cycle of the electromagnetic actuator 146 is controlled so as to move the valve member 140 back and forth with respect to the valve seat 143 in accordance with a control signal fed from a controller described later. In accordance with the motion of the valve member 140, intake air is admitted into the passage 136 via the passage 86 at a controlled rate. The intake air admitted into the passage 136 is mixed with the intake vacuum admitted from intake passage 20 downstream of the throttle valve 30 via the vacuum induction passage 69 into the vacuum chamber 66, so as to produce the control vacuum. The control vacuum thus produced is fed into the chamber 130 of the actuator 122 via the control vacuum passage 134 to control the opening and closing of the EGR control valve 116. Thereby, the exhaust gas is admitted into the intake manifold at a controlled rate.

An air regulator 150 is provided adjacent the throttle chamber 28 for regulating the intake air flow through the throttle chamber. Also, a carbon canister 152 is provided. The carbon canister retains fuel vapor until the canister is purged with air through the purge line 154 into the intake manifold when the engine is running. When the engine runs at idle, the purge control valve 156 is closed. Only a small amount of purge air flows into the intake manifold through the constant purge orifice. As the engine speed increases, and the ported vacuum raises higher, the purge control valve opens and the vapor is drawn into the intake manifold through both the fixed orifice and the constant purge orifice.

Figure 2:
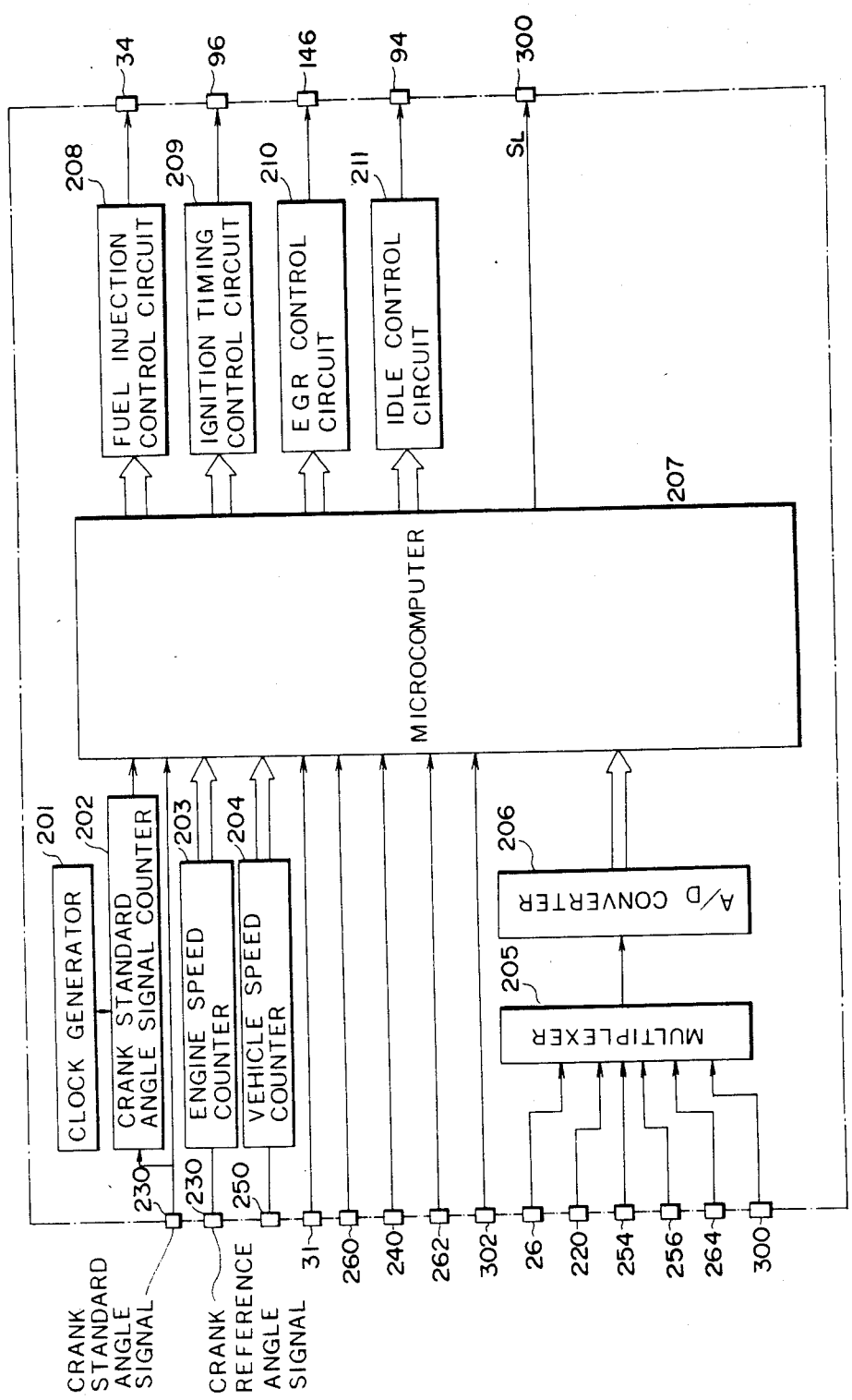
FIG. 2 is a block diagram of a control unit in the engine control system of FIG. 1.

As shown in FIGS. 1 and 2, the controller 200 generally comprises a microcomputer 207 and controls a fuel injection system, a spark ignition system, an EGR system and the idle engine speed. The controller 207 is connected to an engine coolant temperature sensor 220. The engine coolant temperature sensor 220 is generally inserted into a coolant chamber 222 in an engine cylinder block 224 in order to measure the engine coolant temperature. The engine coolant temperature sensor 220 produces an engine coolant temperature signal $T_w$ indicative of the measured engine coolant temperature. The engine coolant temperature signal $T_w$ is an analog signal having a voltage value proportional to the measured engine coolant temperature and is converted into a digital signal to adapt it for use in the microcomputer 207 by an analog-digital convertor 206 via a multiplexer 205.

In general construction, the engine coolant temperature sensor 220 comprises a thermistor fitted onto a thermostat housing 226 provided in the coolant circulation circuit.

A crank angle sensor 230 is also connected to the controller 200. The crank angle sensor 230 generally comprises a signal disc 232 secured onto a crank shaft 234 for rotation therewith, and electomagnetic pick-ups 236 and 237. The crank angle sensor 230 produces a crank reference signal and a crank position signal. As is well known, the crank reference signal is produced when an engine piston reaches top dead center and the crank position signal is produced for each given crank rotation angle, e.g., each 1 degree of crank rotation.

The crank position signal is inputted to an engine speed counter 203 to determine engine speed. The engine speed counter 203 produces an engine speed signal $N_{RPM}$ corresponding to the frequency of the crank position signal. The crank reference signal is directly inputted to the controller 200 and is also inputted to a crank reference signal counter 202 which determines the duration of the crank reference signal. To the crank reference signal counter 202 is also inputted a clock signal produced by a clock generator 201.

A transmission neutral switch 240 is also connected to the controller 200. The transmission neutral switch 240 is secured to the power transmission 242 to detect the neutral position thereof and produces a neutral signal when the transmission neutral position is detected.

Also, a vehicle speed sensor 250 is connected to the controller via a vehicle speed counter 204. The vehicle speed sensor 250 is located near a vehicle speed indicator 252 and produces a pulse signal as a vehicle speed signal with a frequency proportional to the vehicle speed.

In the exhaust gas passage 102, there is provided an exhaust gas temperature sensor 256 in the exhaust gas purifier housing 210. The exhaust gas temperature sensor 256 measures the exhaust gas temperature and produces an analog signal as an exhaust gas temperature signal, which has an analog signal value proportional to the measured exhaust gas temperature. The exhaust gas temperature signal is fed to the controller 200 via the multiplexer 205 and the analog-digital converter 206 in which the exhaust gas temperature signal is converted into a digital signal for application by the microcomputer 207. The digital signal indicative of the exhaust gas temperature has a frequency corresponding to the analog value indicated by the exhaust gas temperature signal. On the other hand, an exhaust gas sensor 254 such as oxygen sensor hereinafter simply referred to as $O_2$ sensor 254 is provided in the exhaust passage 102 upstream of the open end of the EGR passage 114. The $O_2$ sensor 254 measures the concentration of oxygen in the exhaust gas. The output of the $O_2$ sensor goes high when the measured oxygen concentration is more than the oxygen ratio 1 in relation to the exhaust gas component and goes low when the oxygen concentration is less than the oxygen ratio 1 in a well know way. The output of the $O_2$ sensor is inputted to the microcomputer 207 via the multiplexer 205 and the analog-digital converter 206 as a $\lambda$-signal.

In addition, the air flow meter 26 is connected with the controller 200. The rheostat 27 of the air flow meter 26 outputs an analog signal with a voltage value proportional to the measured intake air flow rate. The throttle angle sensor 31 is also connected to the microcomputer 207 to supply the outputs of the full throttle switch and the idle switch.

As shown in block form in FIG. 2, the microcomputer 207 is also connected to an air-conditioner switch 260, a starter switch 262 and a battery voltage sensor 264. The air conditioner switch 260 is turned on in order to operate the air conditioner. Similarly, the starter switch 262 is turned on in order to operate a starter motor. The battery voltage sensor 264 measures the vehicle battery voltage and produces an analog signal with a voltage value proportional to the measured battery voltage. The battery voltage signal is fed to the microcomputer 207 via the multiplexer 205 and the analog-digital converter 206.

In the shown embodiment, the controller 200 controls the fuel injection amount and timing, the spark ignition timing, EGR rate and engine idling speed.

For controlling the fuel injection amount in stable engine conditions, which is recognized on the basis of the engine speed determined by the engine speed counter 203, the throttle valve angle position detected by the throttle angle sensor 31, the vehicle speed determined by the vehicle speed counter 204 and so on, the $O_2$ sensor signal fed from the $O_2$ sensor 254 is used. Under stable engine conditions, the fuel injection amount is feedback controlled on the basis of the $O_2$ sensor signal so that the air/fuel ratio can be controlled to a stoichiometric value, i.e., by means of the so-called $\lambda$-control method. If the engine condition is unstable, the fuel injection amount is determined generally on the basis of the engine speed and the intake air flow rate, which can be replaced by intake vacuum downstream of the throttle valve. Under unstable engine conditions, the basic fuel injection amount determined on the basis of the engine speed and the air flow rate is corrected in correspondence with other parameters such as the air-conditioner switch position, the transmission gear position, the engine coolant temperature and so on.

The spark ignition timing, i.e., spark advance or retard, is generally controlled on the basis of the engine speed, the air flow rate, the engine coolant temperature and so on which are indicative of engine operating conditions.

The EGR control is effected on the basis of the engine speed, the engine coolant temperature, the ignition switch position and the battery voltage. On the basis of the engine speed and a basic fuel injection amount determined in accordance with the engine speed and the engine load, the recirculation rate of the exhaust gas is determined. The duty cycle of the EGR control valve is then controlled in accordance with the determined recirculation rate.

The idle engine speed is controlled basically in relation to the engine coolant temperature and engine load condition. In a relatively cold engine, the engine speed is controlled to a predetermined value which is determined on the basis of the engine coolant temperature in order to effect fast idle operation. In the normal temperature range, the engine speed is feedback controlled on the basis of the difference between the actual engine speed and a reference engine speed related to the engine temperature, engine load condition and other parameters.

For the sake of explanation, FIG. 3 illustrates an electronic spark ignition control system with a fail-safe system according to the first embodiment of the present invention. As will be appreciated, the shown embodiment is directed to ignition control for 6-cylinder engine as an example. However, the ignition system with the fail-safe system according to the present invention is applicable to any size or arrangement of engine.

Figure 4:
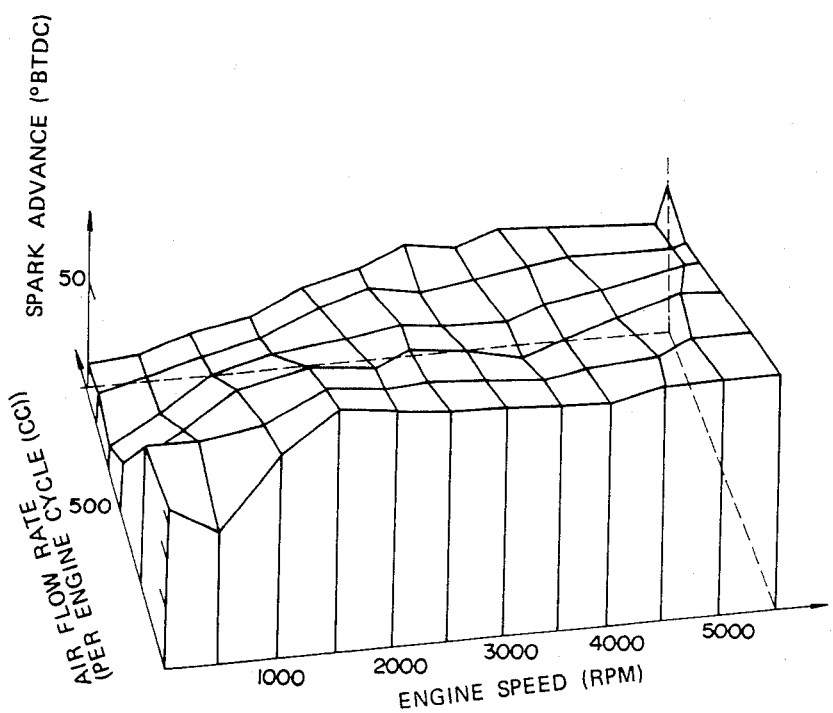
FIG. 4 shows a three dimensional table for determining spark advance angle on the basis of intake air flow rate and engine speed.

In FIG. 3, an ignition control unit 2000 generally comprises a microcomputer including a CPU 2002, RAM 2004, ROM 2006 and an interface 2008. The interface 2008 is connected to a crank angle sensor 230 to receive crank reference signal $S_1$ and a crank position signal $S_2$, and the air flow meter 26 to receive therefrom an air flow meter signal $S_Q$ representative of the intake air flow rate. The crank angle sensor 230 is also connected to the engine speed counter 22. The engine speed counter 203 is adapted to produce an engine speed signal $S_N$ representative of the engine speed derived from the crank position signal $S_2$. The CPU 2002 in the control unit 2000 reads the required spark advance angle from a three-dimensional table as shown in FIG. 4 stored in ROM 2006, in accordance with the current value Q of the air flow meter signal $S_Q$ and value N of the engine speed signal $S_N$. On the basis of the determined spark advance angle, the CPU controls spark ignition timing by activating a power transistor 99 to produce a relatively high voltage of ignition power in a secondary winding in an ignition coil 98. The ignition power produced in the ignition coil 98 is fed to a distributor 96 for sequential distribution to ignition plugs 97a to 97f in synchronism with the engine revolution.

Figure 5:
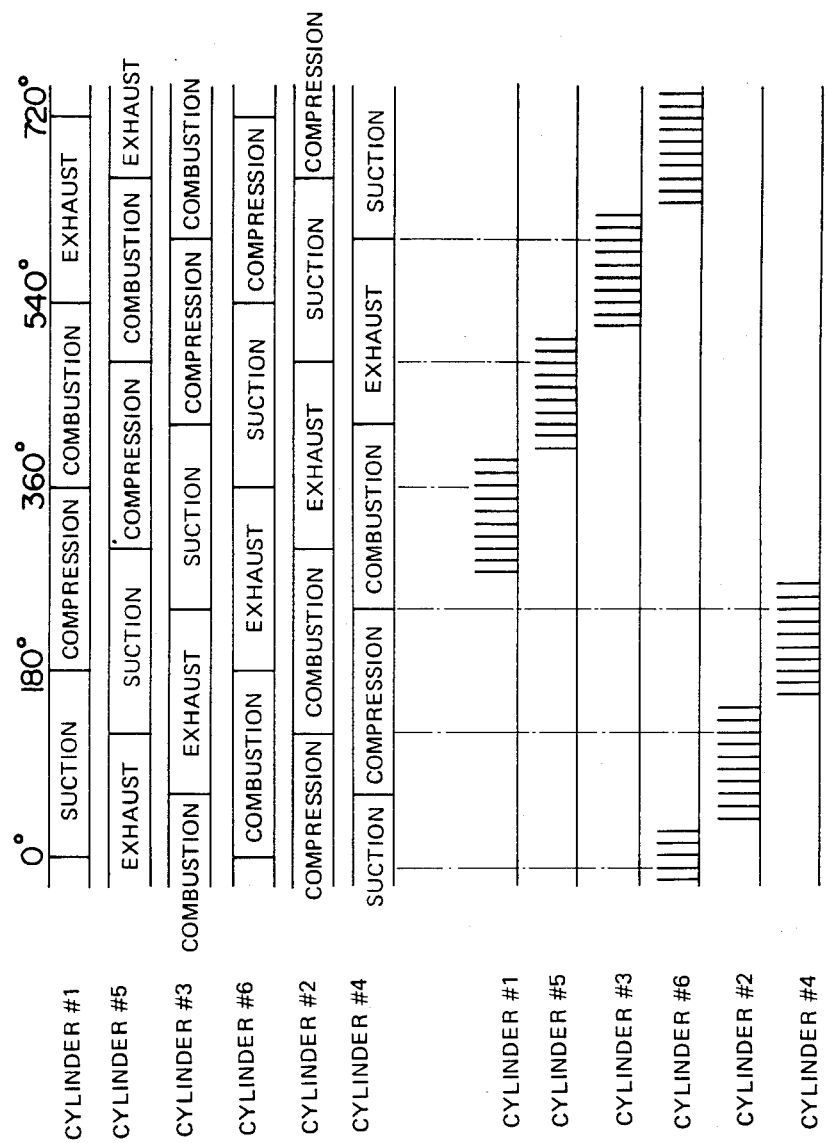
FIG. 5 is a timing chart showing an explanatory example of the spark ignition timing of a six-cylinder engine.
Figure 6:
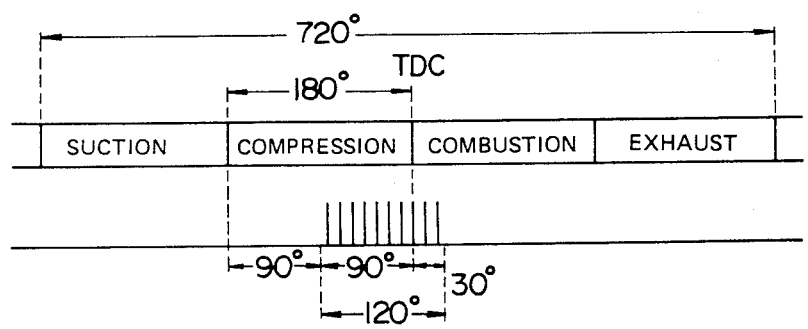
FIG. 6 is a timing chart showing the relationship of the engine revolution cycle and spark ignition.

In general ignition control, the spark ignition timing is defined by the determined spark advance angle and the crank reference signal indicative of the engine piston top dead center position of two of the six cylinders. At the specified spark ignition timing, the bias voltage applied to the base electrode of the power transistor drops to LOW level to induce the high voltage ignition power in the secondary winding. The general spark ignition timing for each engine cylinder in relation to the engine revolution is as illustrated in FIGS. 5 and 6. Assume that at the crank shaft angular position 0°, the cylinders #1 and #6 are at top dead center. In this position, the pistons in the cylinders #5 and #2 are in the compression stroke and the pistons in the cylinders #3 and #4 are in the expansion stroke. In this crank shaft angular position, the ignition power is supplied to the ignition plug 36d in the cylinder #6 to effect combustion therein. In fact, the ignition signal $S_9$ to cut-off the power transistor 99 is produced at a crank shaft angular position prior to the crank shaft angular position at 0°. The advanced angle for producing the ignition signal $S_9$ corresponds to the spark advance angle determined by the control unit 2000. Namely, assuming the determined spark advance angle is 30° ahead of top dead center and the crank reference signal $S_1$ is produced at the crank shaft angular position 70° ahead of top dead center, the ignition signal $S_9$ will be produced 40° after the crank reference signal. As apparent from FIGS. 5 and 6, the ignition signal $S_9$ is a trains of pulses with a predetermined pulse width, e.g. approximately 2 ms, which are repeated for a period corresponding to crank shaft rotation of about 120° in the case of a six-cylinder engine.

Thus, the spark ignition is effected in each cylinder according to the engine revolution by distribution of the ignition power by the distributor 34.

Figure 7:
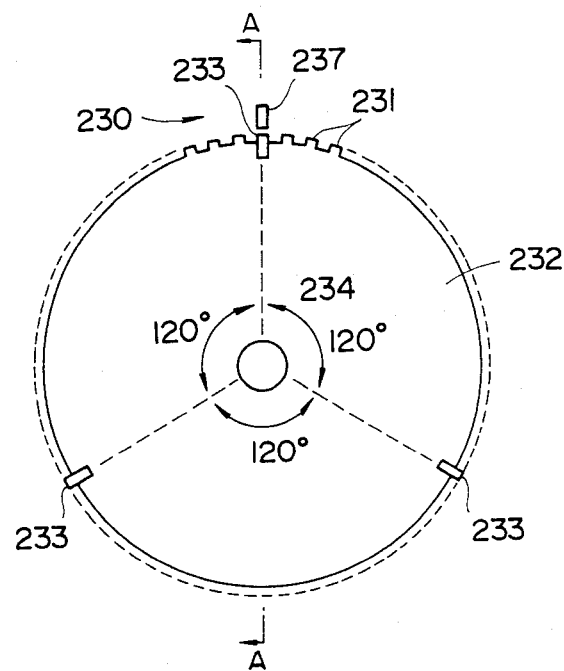
FIG. 7 is a fragmentary front elevation of a crank angle sensor used in the ignition control of FIG. 3.
Figure 8:
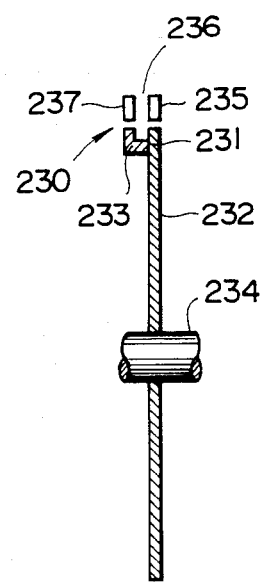
FIG. 8 is a side elevation of the crank angle sensor of FIG. 7.
Figure 9:
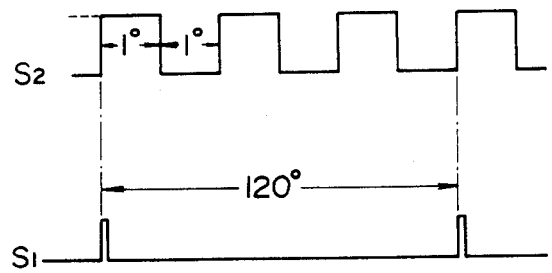
FIG. 9 shows pulse forms produced by the crank angle sensor of FIGS. 7 and 8 by respective pick-ups.

As shown in FIGS. 7 and 8, the crank angle sensor 230 generally comprises a rotary disc 232 secured to the engine crank shaft 234. The rotary disc 232 is made of a magnetic material and is provided with a plurality of teeth 231 on the periphery thereof. The teeth are spaced regularly apart from each other so as to be arranged radially symmetrically. The spacing between the teeth 231 corresponds to a crank shaft rotational angle of 2°. A magnetic pick-up 235 opposes the periphery of the rotary disc to constitute a kind of proximity switch which produces a pulse signal whenever one of teeth 231 approaches within a predetermined distance of the magnetic pick-up. In addition, a tab 233 is secured to the rotary disc 232. In the shown embodiment, three tabs 233 are secured to the periphery of the rotary disc 232 mutually separated by about 120° with respect to the center of the rotary disc. The tabs are also made of the magnetic material and oppose a second magnetic pick-up 237 in order to produce a relatively short pulse signal whenever the outer edge of the tab 233 approaches to within a given distance of the magnetic pick-up. Thus, as with the foregoing teeth 231 and the magnetic pick-up 235, the tabs 233 and the magnetic pick-up 237 constitute a kind of proximity switch. Therefore, the magnetic pick-up 235 produces a pulse train $S_2$, the signal level of which alternates between HIGH and LOW level every 1° of crank shaft rotation and the magnetic pick-up 237 produces a brief pulse $S_1$ for every 120° of crank shaft rotation. As can be seen, the pulse train $S_2$ serves as the crank position signal and the pulse $S_1$ serves as the crank reference signal.

Returning to FIG. 3, the control unit 2000 is connected to an oscillator 2010 which produces a pulse signal $S_7$ with a predetermined frequency. The pulse signal $S_7$ of the oscillator 2010 is fed to a switching circuit 2012. The switching circuit 2012 is adapted to switch output of the ignition signal $S_9$ to the pulse signal $S_7$ in response to a fault signal $S_8$ produced by the control unit 2000 when errors in or failure of the crank angle sensor 230 is detected. The fault signal $S_8$ is also fed to an fault indicator 101 via a switching transistor 103.

The CPU 2002 receives the crank reference signal $S_1$ and the crank position signal $S_2$ and produces a fault signal $S_8$ when either of the crank reference signal or the crank position signal is absent. The fault signal $S_8$ is fed to the switching circuit 2012 in order to switch the output thereof from a pulse signal $S_5$ from the interface 2008 to a pulse signal $S_7$ with a predetermined frequency from the oscillator 2010. The output frequency of the oscillator 2010 is variable in accordance with the presence or absence of the starter signal $S_6$ from the starter switch 262. Specifically, in the shown embodiment, the oscillator 2010 is adapted to produce a pulse signal of frequency about 30 Hz as long as the starter signal $S_6$ is HIGH, i.e., while the starter switch 262 remains in the ON position. If the starter switch 262 is OFF and therefore, the starter signal $S_6$ is LOW, the frequency of the pulse signal $S_7$ is approximately 300 Hz. In either case, the pulse width of the pulse signal $S_7$ is fixed to be about 2 ms in order to ensure sufficient dwell time for satisfactory ignition in the engine cylinder.

Figure 10:
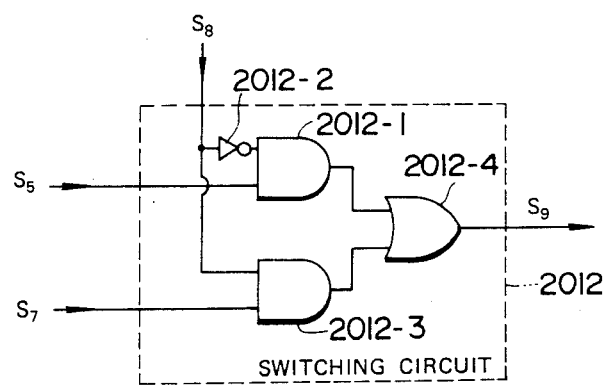
FIG. 10 is a circuit diagram of a switching circuit in the ignition control system of FIG. 3.

FIG. 10 shows the preferred construction of the switching circuit 2012 in the ignition control system of FIG. 3. The switching circuit 2012 comprises AND gates 2012-1 and 2012-3, and an OR gate 2012-4. The AND gate 2012-1 is connected to the interface 2008 of the microcomputer via an inverter 2012-2 to receive the inverted fault signal $S_8$. Therefore, to the first input terminal of AND gate 2012-1, a HIGH level signal is applied as long as the fault signal $S_8$ remains LOW. On the other hand, the fault signal $S_8$ is also fed to the one of the input terminals of the AND gate 2012-3. The other input terminal of the first AND gate 2012-1 is also connected to the interface 2008 to receive therefrom the pulse signal $S_5$. On the other hand, the other input terminal of the other AND gate 2012-3 is connected to the oscillator 2010 to receive therefrom the pulse signal $S_7$.

In this arrangement, the AND gate 2012-1 is responsive to the pulse signal $S_5$ as long as the fault signal $S_8$ remains LOW to transmit the pulse signal $S_5$ as the ignition signal $S_9$. If malfunction of the crank angle sensor 230 is detected, the fault signal $S_8$ goes HIGH to close the AND gate 2012-1 and open the AND gate 2012-3 in response to the pulse signal $S_7$. In this case, the pulse signal $S_7$ produced by the oscillator 2010 is outputted as the ignition signal $S_9$.

Figure 11:
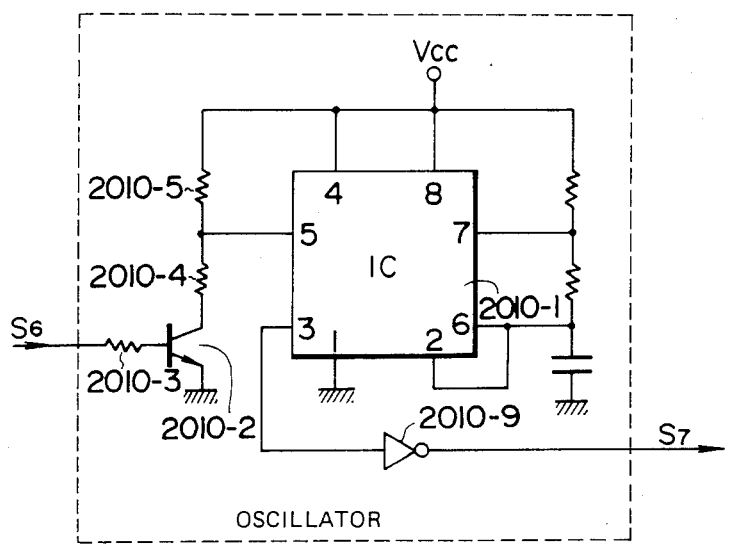
FIG. 11 is a schematic diagram of an oscillator in the ignition control system of FIG. 3.

FIG. 11 shows the preferred construction of the oscillator 2010 in the ignition control system of FIG. 3. The oscillator 2010 generally comprises a timer IC unit 2010-1 such as Signetics NE 555 (Trademark). The IC unit 2010-1 is connected to the starter switch 262 at terminal-5 via a resistor 2010-3, a transistor 2010-2 and dividing resistors 2010-4 and 2010-5. The output terminal-3 of IC unit 2010-1 is, in turn, connected to the switching circuit 2012 via an inverter 2010-9.

Figure 12:
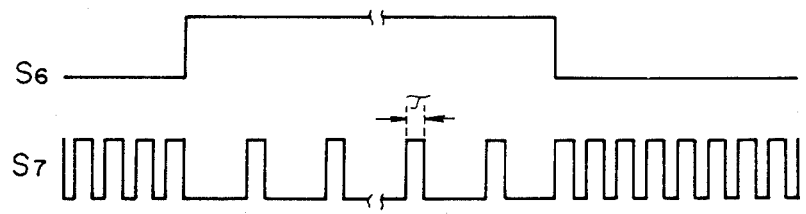
FIG. 12 shows the waveform of a pulse produced by the oscillator of FIG. 11 in relation to the starter signal.

The IC unit 2010-1 is adapted to vary its output frequency depending on the absence and presence of the HIGH level starter signal $S_6$. As set forth previously, in the absence of the starter signal $S_6$, the output frequency of the IC unit 2010-1 is approximately 30 Hz. Alternatively, when the starter signal $S_6$ is HIGH, the output frequency of the IC unit 2010-1 is about 300 Hz. The variation of the output frequency of the IC unit is illustrated (not to scale) in FIG. 12 in relation to the starter signal level.

Thus, during engine cranking in which the engine speed is approximately 200 r.p.m., the possibility of spark ignition at an crank shaft angular position significantly ahead of top dead center is eliminated or satisfactorily reduced. In the preferred embodiment, it is possible to vary the IC unit output frequency in proportion to the engine speed in order to obtain the necessary repetition, e.g. 5 times, of spark ignition for each combustion cycle. In this case, since the crank angle sensor is malfunctioning, the engine speed must be derived from other parameters such as vehicle speed and transmission gear position and so forth.

Figure 13:
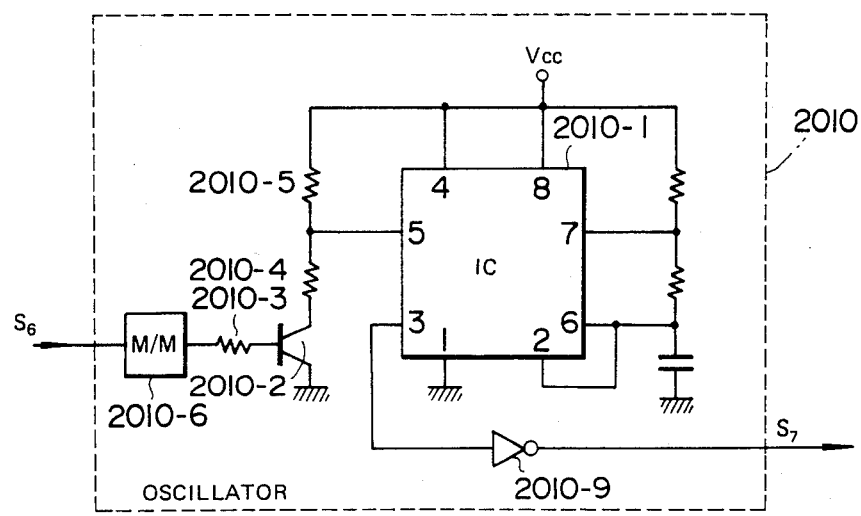
FIGS. 13 and 14 respectively show modifications of the oscillator of FIG. 11.

FIG. 13 shows a modification of the oscillator 2010. In this modification, a monostable multivibrator 2010-6 is interposed between the starter switch 262 and the resistor 2010-3. The monostable multivibrator 2010-6 is triggered by the HIGH level starter signal $S_6$ for a given period of time. The IC unit 2010-1 is responsive to the HIGH level trigger signal from the monostable multivibrator 2010-6 to lower its output frequency for as long as the monostable multivibrator is triggered.

Figure 14:
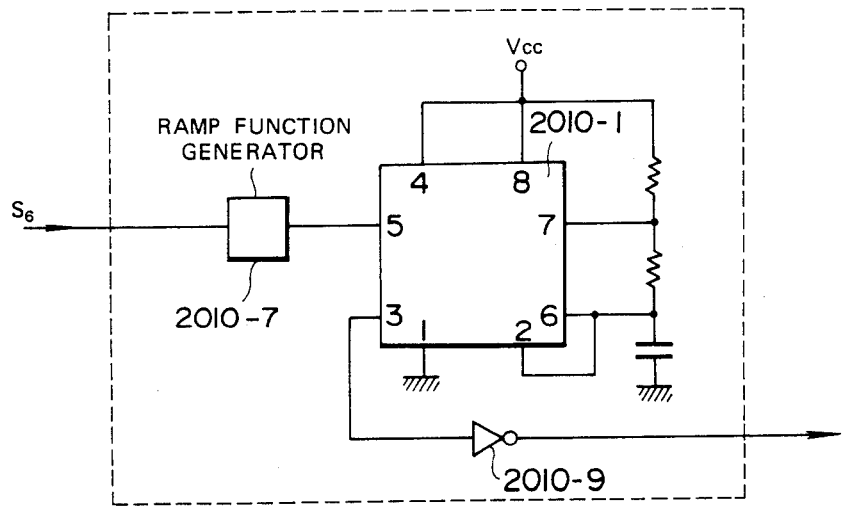

FIG. 14 is another modification of the oscillator 2010. In this modification, a function generator 2010-7 for producing a ramp function signal is inserted between the starter switch 262 and the IC unit 2010-1. The function generator 2010-7 is adapted to produce the ramp function signal, i.e., a linearly increasing voltage, as long as the starter signal $S_6$ is maintained at HIGH level or for a given period after the starter signal is turned to HIGH level. The function generator 2010-7 may comprise a flip-flop and an integrator.

Figure 15:
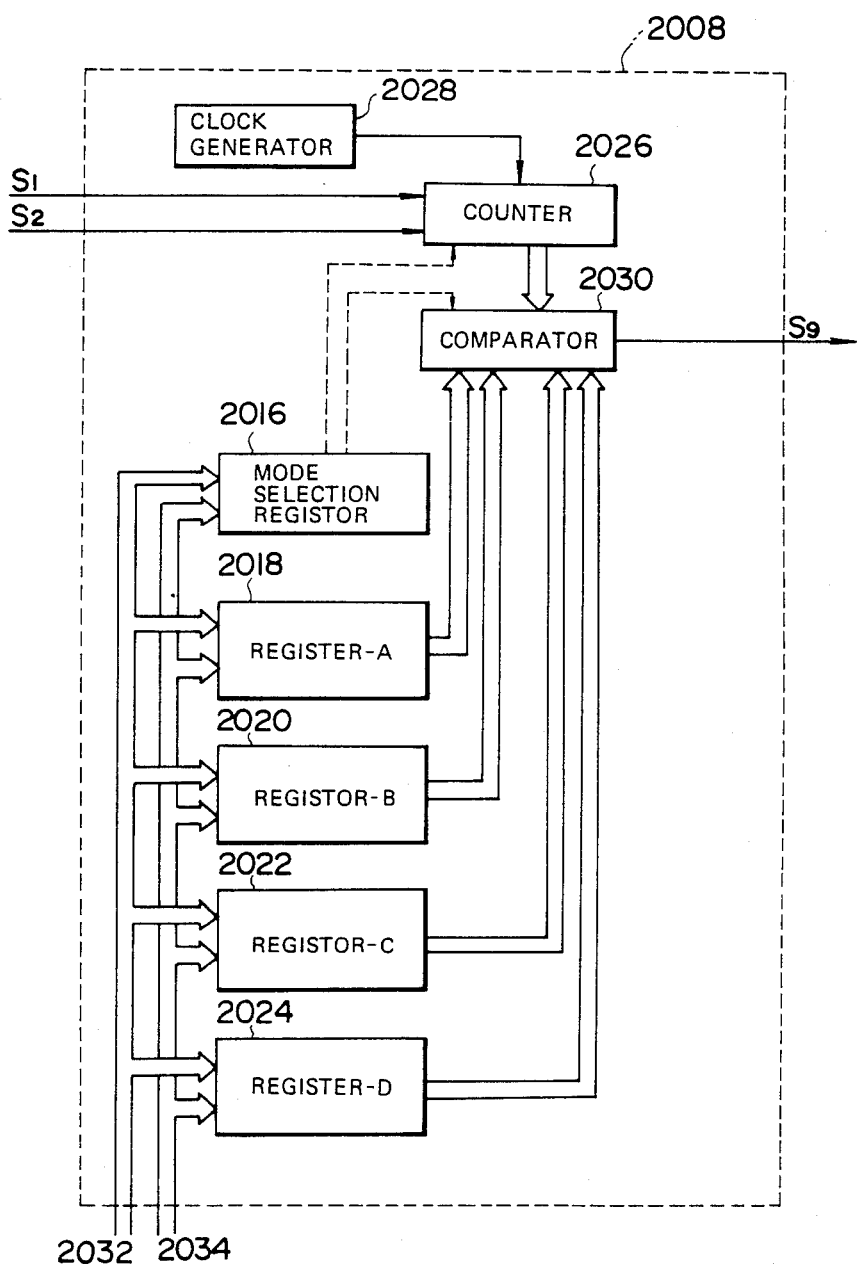
FIG. 15 is a block diagram of an interface in a control unit of the ignition control system of FIG. 3.
Figure 16:
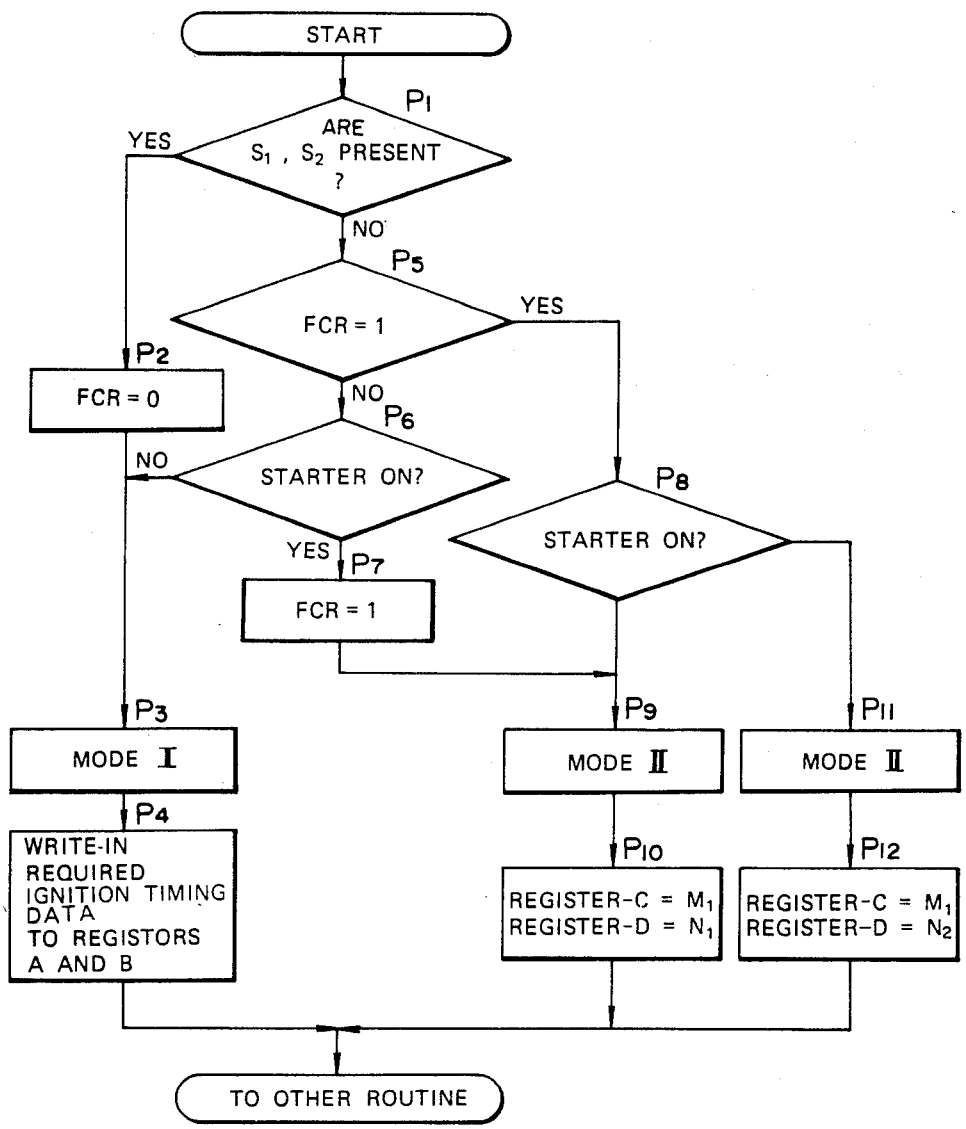
FIG. 16 is a flowchart of a fail-safe program to be executed by the ignition control system of FIG. 3.

It is also possible to monitor crank angle sensor operation by executing a check program in the CPU 2002, which is stored in the ROM 2006. The check program is executed in the CPU at regular intervals. The flowchart of the check program to be executed for checking the operation of the crank angle sensor 230 is as illustrated in FIG. 16. In this case, the check program will perform the functions of the oscillator 2010 and the switching circuit 2012 by acting on other registers provided in the interface unit 2008, as described in detail below. Before describing the details of the check program, the construction of the output unit of the interface 2008 for outputting the ignition signal $S_9$ will be described in detail with reference to FIG. 15. As shown in FIG. 15, the interface 2008 has a mode selection register 2016 which switches the mode between MODE I and MODE II. In MODE I, the interface 2008 functions as a monostable multivibrator responsive to an external trigger signal. In the shown system, the crank angle sensor signal serves as the external trigger signal. In the MODE II, the interface 2008 acts as an astable multivibrator responsive to an internal clock. The interface also includes a counter 2026 connected to the mode selection register 2016 and, in turn, to a clock generator 2028. The counter 2026 is also connected to a comparator 2030. The comparator 2030 receives reference signals respectively representative of preset values from register-A 2018 and Register-B 2020 or from register-C 2022 and register-D 2024.

In the MODE I, the counter 2026 is responsive to the crank reference signal $S_1$ acting as an external reset signal and counts the crank position signals $S_2$ acting as external clock pulses. The counter value in the counter 2026 is compared with the preset value in the register-A 2018 in the comparator 2030. The comparator 2030 produces a comparator signal of HIGH level until the counter value matches the preset value of register-A. The comparator 2030 also compares the counter value of the counter 2026 with the preset value in the register-B 2018 to change the comparator signal level to HIGH level when the counter value reaches the preset value of the register-B 2018. The counter is cleared everytime the counter value reaches the preset value of either the register-A 2016 or the register-B 2018.

It will be appreciated that the preset value in the register-A 2016 corresponds the pulse duration of the ignition signal $S_9$ and the preset value in the register-B 2018 corresponds to the required spark advance angle derived from the engine speed N and the air flow rate Q on the basis of the three dimensional table of FIG. 4.

When malfunction of the crank angle sensor 230 is detected, the CPU feeds the fault signal $S_8$ through data-bus 2032 and 2034 to the mode selection register. In response to the fault signal $S_8$, the mode selection register 2016 changes the operation mode from MODE I to MODE II. At this position, the counter stops counting the crank position signal and starts counting the clock pulses from the clock generator 2028. The comparator 2030 compares the counter value in the counter 2026 with preset values in the register-C 2022 and the register-D 2024 in MODE II in place of register-B and register-A respectively. The preset value in the register-C 2022 corresponds to a predetermined fixed spark ignition timing and the preset value in the register-D 2024 corresponds to the pulse duration of the ignition signal to be fed to the ignition coil 98. In this case, the comparator signal based on the counting of the clock pulse of the clock generator 2028 serves as the ignition signal.

In the shown embodiment, the pulse duration of the ignition signal, when the crank angle sensor malfunctions, is variable depending on the starter switch position, i.e. whether engine is cranking for starting or is running after cranking. In practice, the CPU monitors the starter switch position to control the preset value in the register-D 2024. If the starter switch 262 is turned on and thus the engine is cranking, the preset value $N_1$ in the register-D 2024 corresponds to about 30 ms of pulse duration. On the other hand, if the engine is running in a state other than cranking, the preset value $N_2$ of the register-D 2024 corresponds to about 1 ms. The preset value $M_1$ to be written into the register-C corresponds to a pulse duration of 2 ms.

Referring to FIG. 16, as set forth, the checking of the crank angle sensor is carried out at regular intervals. In a block $P_1$ immediate after START of the checking program, presence of the crank reference signal $S_1$ and the crank position signal $S_2$ is checked. If both of the crank reference signal $S_1$ and the crank position signal $S_2$ are present, a flag FCR is set to 0 (zero) in a block $P_2$. Thereafter, the mode selection register 2016 is set to the MODE I in a block $P_3$. At this case, the preset values for the register-A 2018 and register-B 2020 corresponding respectively to the ignition pulse width and the determined spark advance angle are written into the registers-A and -B, at a block $P_4$. Then, the checking program is ended and control of the CPU goes to another routine.

On the other hand, if either one of the crank reference signal $S_1$ and the crank position signal $S_2$ is absent, the flag FCR is checked to see whether the flag is 1 (one), at a block $P_5$. If the flag FCR is not 1, the starter switch 262 is checked to see whether it is turned on, in a block $P_6$. If NO, i.e. if the starter switch is OFF, execution of the check program goes to the block $P_3$ so that the system will act as if the crank angle sensor 230 is functioning normally. If starter switch is ON, the flag FCR is set to 1 in a block $P_7$. Then the mode selection register 2016 is changed to MODE II in a block $P_9$ and the preset values $M_1$ and $N_1$ are written into the registers-C and -D 2022 and 2024 in a block $P_{10}$.

If in block $P_5$ the flag FCR is equal to one, then the starter switch state is checked in a block $P_8$. If the starter switch is OFF upon checking in the block $P_8$, the mode selection register 2016 is set to the MODE II in a block $P_{11}$ and the preset values $M_1$ and $N_2$ are written into the registers-C and -D in a block $P_{12}$. If the starter switch is ON, then the program proceeds to previously-described block $P_9$. After either of blocks $P_{10}$ and $P_{12}$, the CPU execution goes to the same routine as described to that in the series of program blocks for normal crank angle sensor condition.

As will be appreciated from hereabove, when the crank reference signal $S_1$ and the crank position signal $S_2$ are both present, the crank angle sensor is distinguished as operating normally. In this case, the ignition control is performed according to the crank reference signal, crank position signal, the engine speed signal and the engine coolant temperature signal with reference to the determined spark advance angle. If malfunction of the crank angle sensor is detected by detecting absence of either the crank reference signal or the crank position signal, an ignition signal with preset timing and frequency will be produced regardless of the crank angle sensor signals. In this condition, the register-C and register -D serve to define the pulse timing and width of the ignition signal.

Figure 17:
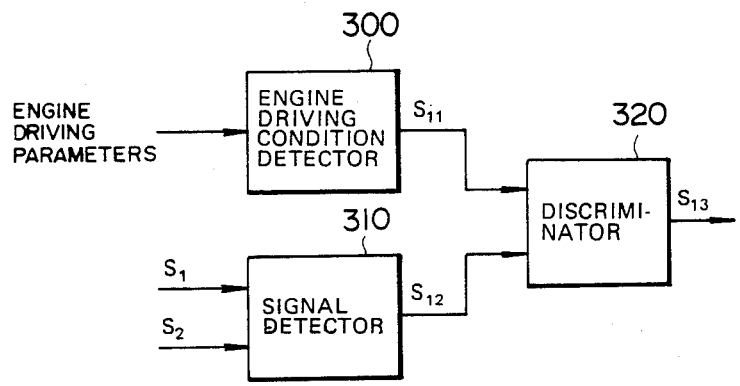
FIG. 17 is a block diagram of an external fault detection circuit for detecting fault in the crank angle sensor operation, which circuit can be incorporated in the ignition control system of FIG. 3.

Although malfunction of the crank angle sensor is detected by the microcomputer in the above systems, it is possible to provide a detecting circuit external to the microcomputer for detecting malfunction of the crank angle sensor. FIG. 17 to 23 show examples of such external fault detecting circuits. FIG. 17 shows the generalized structure of the fault detecting circuit for detecting crank angle sensor malfunction. The fault detecting circuit generally comprises an engine operating condition detector 300, a signal detector 310 and a discriminator 320. The engine operating condition detector 300 is adapted to produce a HIGH level signal $S_{11}$ when the engine is running. On the other hand, the signal detector 310 is adapted to produce a HIGH level signal $S_{12}$ when both the crank reference signal $S_1$ and the crank position signal $S_2$ are present. The discriminator 320 produces a HIGH level discriminator signal $S_{13}$ when the engine is running and both the crank reference signal and the crank position signal are present, and thus, it recognizes that the crank angle sensor 230 is operating normally. Otherwise, the discriminator 320 outputs a LOW level signal $S_{13}$.

Figure 18:
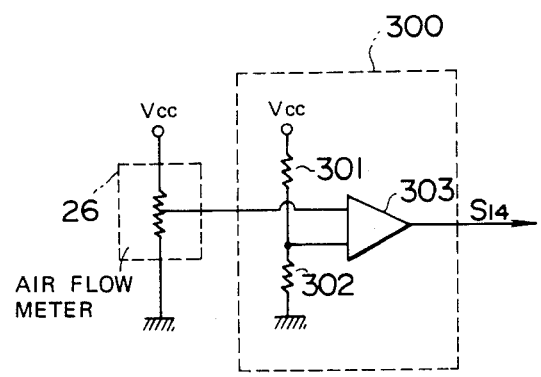
FIG. 18 is a circuit diagram of one example of an engine driving condition detection circuit in the fault detection circuit of FIG. 17.

FIGS. 18 to 21 show the detail of the circuit elements of the fault detecting circuit of FIG. 17. As shown in FIG. 18, the engine operating condition detector 300 comprises a differential amplifier 303 connected to the air flow meter 26 (shown in FIG. 1) at its negative input terminal ($-$). The positive input terminal ($+$) of the differential amplifier 303 is connected to a power source via dividing resistors 301 and 302. The resistor values of the dividing resistors 301 and 302 are selected to apply a predetermined reference voltage to the positive input terminal of the differential amplifier. The predetermined reference value corresponds to the air flow meter output when the engine is not running. Therefore, as long as the engine is running, the differential amplifier 303 produces a HIGH level comparator signal $S_{11}$. The air flow meter in this example can be replaced by a pressure sensor producing a vacuum signal depending on the intake vacuum pressure. In this case, the differential amplifier can be eliminated from the detecting circuit.

Figure 19:
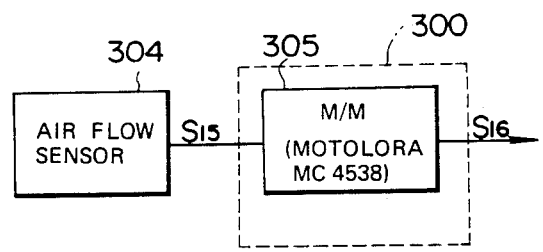
FIG. 19 is a circuit diagram of another example of the engine driving condition detection circuit in the fault detection circuit of FIG. 17.

FIG. 19 shows another example of the engine operating condition detector 300. In this example, a Karman vortex air flow sensor 304 is used to detect the engine operating condition. The flow sensor 304 produces a pulse signal $S_{15}$ with a frequency proportional to the air flow rate. The pulse signal $S_{15}$ is fed to a retriggerable monostable multivibrator 305 such as Motolora MC14538. The monostable multivibrator 305 is triggered by the pulse signal $S_{15}$ for a given period and produces a HIGH level trigger signal $S_{16}$ as long as it is triggered. If the pulse interval of the pulse signal $S_{15}$ is shorter than the given trigger period of monostable multivibrator 305, the monostable multivibrator is retriggered by the pulse signal $S_{15}$, so that the output of the monostable multivibrator 305 will remain at HIGH level. Thus, the output $S_{11}$ will be HIGH as long as the engine is running.

On the other hand, as shown in FIG. 20, the signal detector 310 comprises retriggerable monostable multivibrators 311 and 312, and a NAND gate 313. The monostable multivibrator 311 is triggered by the crank reference signal $S_1$ and the monostable multivibrator 312 is triggered by the crank position signal $S_2$. The trigger period of the monostable multivibrator 311 corresponds substantially to the period of the crank reference signal $S_1$ at an engine speed of approximaely 20 r.p.m. On the other hand, the trigger period of the monostable multivibrator 312 is about 1/60 of that of the monostable multivibrator 311. Therefore, if the engine is running, both of the monostable multivibrators 311 and 312 remain triggered to produce HIGH level trigger signals. The NAND gate 313 is responsive to coincidence of the HIGH level trigger signals to output a LOW-level signal. Thus, whenenver one or both of the crank reference signal $S_1$ and the crank position signal $S_2$ are absent, the signal detector 310 outputs a HIGH-level signal $S_{12}$.

FIG. 21 shows the detail of the discriminator 320 which comprises an AND gate 321. One of the input terminals of the AND gate 321 is connected to the engine operating condition detector 300 to receive the signal $S_{11}$. The other input terminal of the AND gate 321 is connected to the signal detector 310 to receive the signal $S_{12}$. As long as the NAND gate output level $S_{12}$ remains LOW, the AND gate 321 produces a LOW level signal $S_{13}$ as a discriminator signal.

The table shown in FIG. 22 shows the discrimination of the crank sensor condition made in the discriminator 320 with respect to the signals $S_{11}$ and $S_{12}$. If the signal level of the signal $S_{11}$ is LOW, because the engine is not running, there is no need to discriminate whether the crank angle sensor is operating normally or abnormally. On the other hand, if the engine is running so that $S_{11}$ is HIGH, the signal level $S_{12}$ must be LOW. Otherwise, one or both of the crank reference signal $S_1$ and the crank position signal $S_2$ is absent due to malfunction of the crank angle sensor. In this case, the discriminator 320 produces the HIGH level discriminator signal $S_{13}$.

Figure 23:
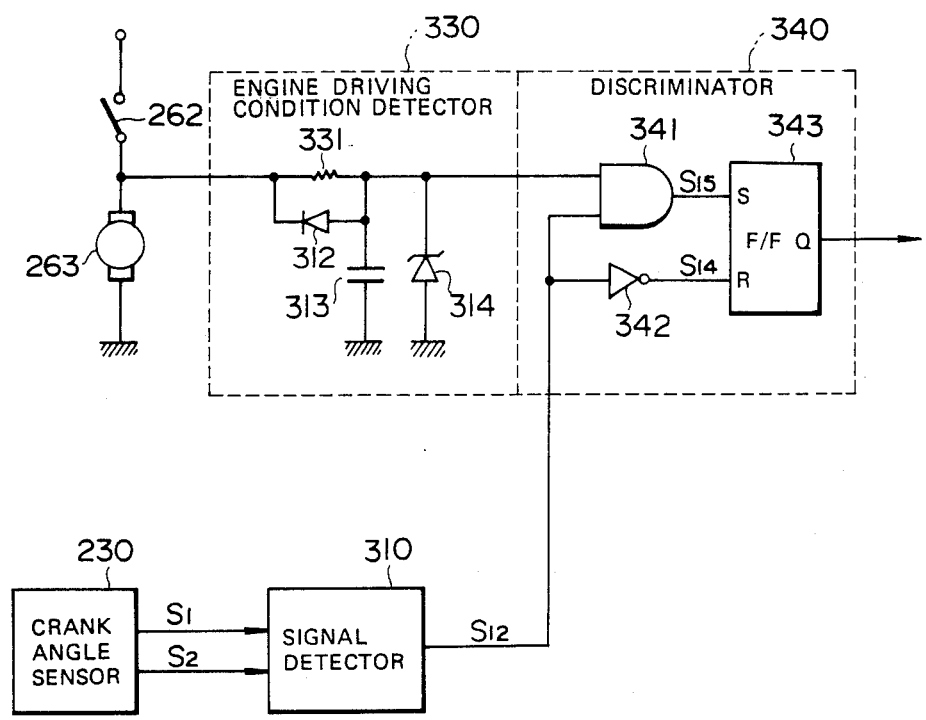
FIG. 23 is circuit diagram of another external fault detection circuit applicable to the ignition control system of FIG. 3.

FIG. 23 shows a modification of the fault detecting circuit cooperating with the crank angle sensor 230. In this modification, the crank angle sensor 230 is connected to the signal detector 310 as set forth with reference to FIGS. 17 and 20. The engine operating condition detector 330 in this embodiment comprises a resistor 331, a diode 312, a capacitor 313 and a Zener diode 314. The resistor 331 and diode 312 are connected in parallel to the starter switch 262 which is, in turn, connected to a starter motor 263. The cathode of the diode 332 is connected to the starter switch 262 and the anode thereof is connected to one terminal of the capacitor 333, the other terminal of which is grounded. The cathode of the diode 312 is also connected to the distal terminal of the resistor 331 and the anode of the Zener diode 334, the cathode of which is grounded. This same connection point constitutes the output of the engine condition detector 330. The Zener diode 334 serves to buffer the output of the engine operating condition detector in order to regulate its output level to about 5 V.

The discriminator 340 comprises an AND gate 341, an inverter 342 and a flip-flop 343, the SET input terminal of which is connected to the AND gate 341 and the RESET input terminal of which is connected to the inverter 342. The inverter 342 outputs an inverter signal $S_{14}$ derived from the signal detector 310, which signal level is normally HIGH in accordance with the normally LOW level signal $S_{12}$. The normally LOW level signal $S_{12}$ is also inputted to the AND gate 341 to keep the output thereof LOW as long as the crank angle sensor 230 is working normally.

If at least one of crank reference signal and the crank position signal is absent, the signal level of the signal detector 310 goes HIGH to enable the AND gate 341. On the other hand, at this time, the inverted signal $S_{14}$ goes LOW. Thus, assuming that the engine is running, the flip-flop 343 is SET to produce a HIGH level flip-flop signal acting as the discriminator signal $S_{13}$.

Again returning to FIG. 3, the control unit 2000 is provided with a non-volatile memory 2014. The non-volatile memory 2014 is adapted to store the last data from the crank reference signal $S_1$ and the crank position signal $S_2$ when malfunction of the crank angle sensor 230 is detected. This facilitates maintenance testing of the crank angle sensor.

Referring to FIGS. 24 to 28, there is illustrated a spark ignition control system according to the second embodiment of the present invention. In this embodiment, an engine knocking is taken as one of the control parameters for ignition control. Therefore, a knocking sensor 266 is connected to the control unit 2000. As apparent from FIG. 24, the control 2000 has substantially the saem construction that of the first embodiment of FIG. 3. Therefore, the detailed description of the corresponding control unit construction may be derived from that of the foregoing first embodiment hereby incorporated by reference.

As in the foregoing first embodiment, the crank angle sensor 230, an air flow meter 26 and starter 262 are also connected to the interface 2008 of the control unit 2000. The crank angle sensor 230 feed the crank reference signal $S_1$ to the interface and feeds the crank position signal $S_2$ to the engine speed counter 203 and to the interface 2008. The engine speed counter 203 produces an engine speed signal $S_N$ having the value proportional to the counter value thereof.

The knocking sensor 266 is per se well known and is adapted to produce an engine knocking signal $S_{16}$ reflecting engine vibrations. Such knocking sensors have been disclosed in British Prepublications Nos. 2,056,763 published on Mar. 18, 1981, 2,056,219 published on Mar. 11, 1981 and 2,061,062 published on May 7, 1981. The disclosures in these citations are incorporated by reference. In addition, detection of engine knocking condition and ignition control depending upon the engine knocking condition are described on the British Prepublications Nos. 2,053,351 published Feb. 4, 1981, 2,061,380 published May 13, 1981. These prior publications are also incorporated by reference.

As will be appreciated from the above references, when the crank angle sensor is working normally, the spark advance will be controlled with reference to the engine knocking condition so that the engine will knock very slightly for better engine performance and efficiency, in a per se well known manner.

On the other hand, failure of the crank angle sensor 230 can be detected by detecting the presence of the crank reference signal $S_1$ and the crank position signal $S_2$ as in the foregoing first embodiment. As in the foregoing first embodiment, the CPU 2002 produces the fault signal $S_8$ to be fed to the switching circuit 2012 via the interface 2008 when malfunction of the crank angle sensor 230 is detected. The switching circuit 2012 is responsive to the fault signal $S_8$ to switch the output thereof from the signal $S_5$ to the signal $S_7$ from the oscillator 2040. The oscillator 2040 has substantially same construction as that of the foregoing first embodiment and thus comprises an IC unit 2040-1. The IC unit 2040-1 is connected to the interface 2008 to receive therefrom a signal $S_{17}$ representative of the engine knocking condition. As apparent from FIG. 26, the voltage level of signal $S_{17}$ varies depending upon the amplitude of the knocking signal $S_{16}$. If the knocking magnitude of the engine exceeds a given threshold, the signal level of the signal $S_{17}$ goes LOW. The LOW level signal $S_{17}$ is fed to the IC unit 2040-1 via the interface 2008. The IC unit 2040-1 is responsive to decrease in the input signal level to increase its output pulse period.

Figure 26:
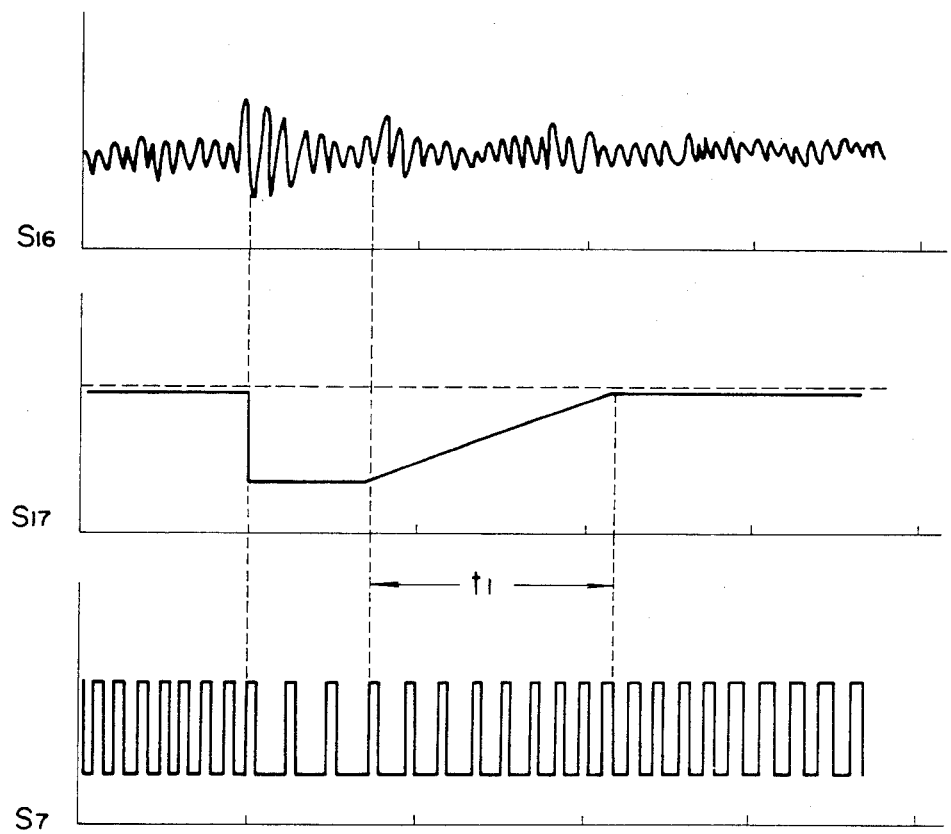
FIG. 26 is a timing chart showing the relationship between the pulse interval of the pulse train produced by the oscillator of FIG. 25, and knocking signals.

As will be appreciated from FIG. 26, the pulse period of oscillator outut $S_7$ will be gradually reduced over an interval $t_1$ as the signal level of the signal $S_{17}$ is gradually raised. Thus, while the crank angle sensor is malfunctioning and the engine is knocking heavily, the frequency of the pulse signal $S_7$ produced by the oscillator 2040 is reduced in order to reduce the possibility of effecting spark ignition at an excessively advanced crank shaft angular position. In the shown embodiment, by increasing the pulse frequency of the oscillator signal $S_7$ gradually after heavy engine knocking ends, engine torque fluctuation and/or cycle-to-cycle fluctuation can be maintained in an acceptable range for better drivability with respect to vehicle surge.

It should be noted that the pulse frequency of the pulse signal $S_7$ produced by the IC unit 2040-1 will be variable within a range from 30 Hz under heavy knocking conditions to 300 Hz under normal or light knocking conditions. In addition, as in the first embodiment, the pulse duration of the signal $S_7$ is fixed at approximately 2 ms in order to ensure sufficient dwell angle for each sparking event.

Figure 27:
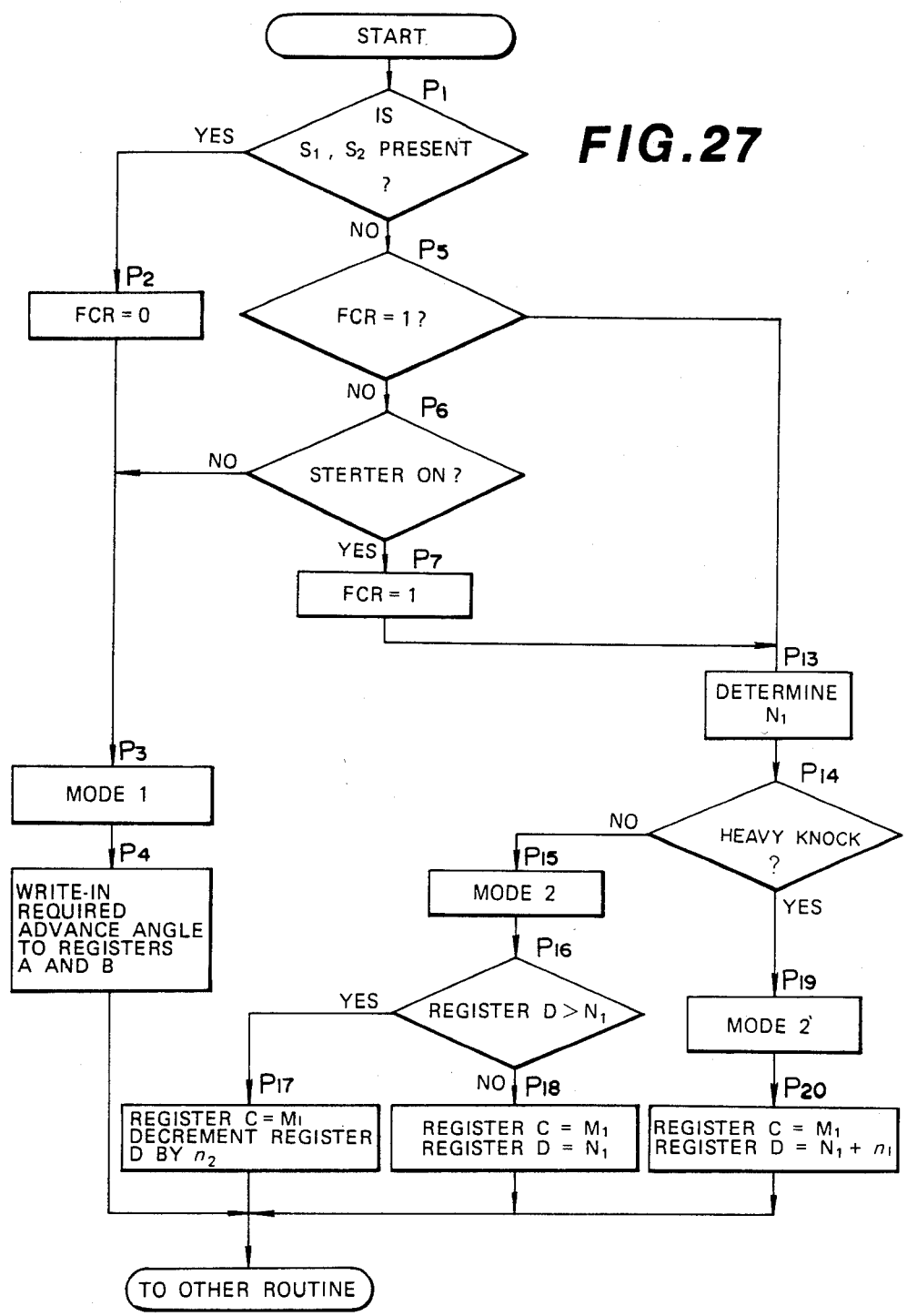
FIG. 27 is a flow chart of a fail-safe program executed by the ignition control system of FIG. 24.
Figure 28:
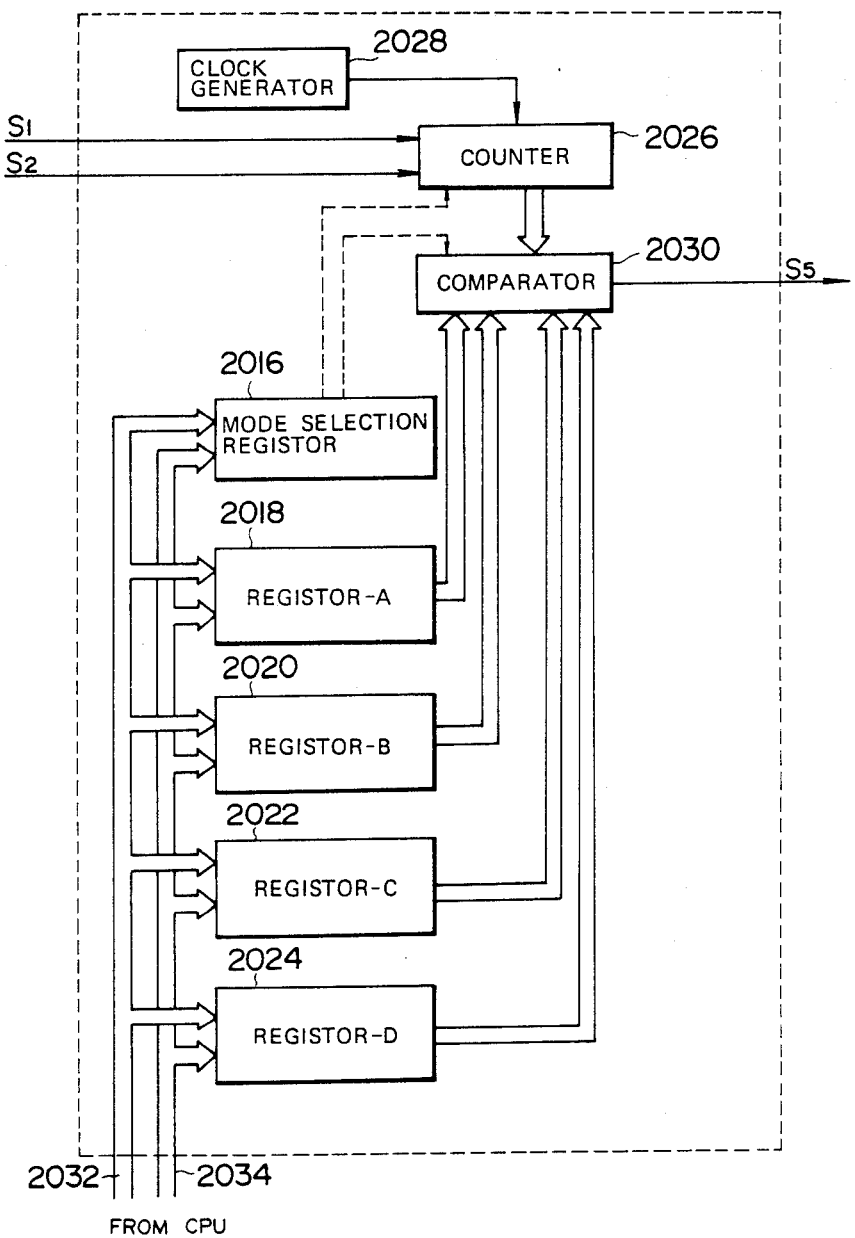
FIG. 28 is a block diagram of the interface in the control unit of the ignition control system of FIG. 24.

The detection of the failure of the crank angle sensor and fail-safe operation can be preformed without the oscillator or the switching circuit of the foregoing second embodiment. In one possible modification, a check and fail-safe program can be executed in the control unit 2000 for the above-mentioned operation. FIGS. 27 and 28 show one of the possible modifications of the second embodiment, in which the control unit 2000 stores the crank angle sensor checking and fail-safe program. The fail-safe program is illustrated in FIG. 27 and will be described hereafter with reference to the function and construction of the interface 2008 in the control unit 2000 as shown in FIG. 15 and FIG. 28. As will be appreciated, the fail-safe program shown in FIG. 27 is similar to that illustrated in FIG. 16 and is adapted to be executed at a suitable rate of repetition.

Referring to FIG. 27, the blocks $P_1$ to $P_7$ are exactly the same as illustrated in FIG. 16. In these blocks, first the existence of the crank reference signal $S_1$ and the crank position signal $S_2$ are checked at the block $P_1$. If both of the signals $S_1$ and $S_2$ are present, the crank angle sensor 262 is considered to be operating normally. In this case, the mode selection register 2016 in the interface 2008 is set to MODE 1 and values representing spark dwell time and determined spark advance angle are written into the registers-A 2018 and -B 2020. Based on the register values in the register-A 2018 and the register-B 2020 and the crank position signals $S_1$, the comparator 2030 produces the ignition signal $S_9$.

If one of or both of the crank reference signal $S_1$ and the crank position signal $S_2$ are absent, then the flag FCR is checked to see whether it is 1 at the block $P_5$. When the flag FCR value is 0, the starter switch position is checked at the block $P_6$. If the starter switch is OFF, the execution of the program goes to the block $P_3$ to execute the normal MODE I ignition control process. Otherwise, i.e., if the starter switch is ON, the flag FCR is set to 1, at the block $P_7$. After the block $P_7$ or if the answer in the block $P_5$ is YES, then, a basic value $N_1$ representing the ignition pulse width is determined according to the engine operating conditions at a block $P_{13}$. In the shown embodiment, the basic value $N_1$ is determined according to the engine speed. Thereafter, the knocking signal $S_{16}$ from the knocking sensor 266 is checked to determine whether the engine is knocking heavily, at a block $P_{14}$. If NO, i.e., the engine is not knocking heavily, the mode selection register 2016 is set to MODE 2 at a block $P_{15}$. At a block $P_{16}$, the value of the register-D 2024 is checked to see whether it is larger than the basic value $N_1$. If the answer in the block $P_{16}$ is YES, the preset value $M_1$ is written into in the register C 2022 and the register value in the register-D 2024 is decremented by $n_2$ which is read out from the RAM 2004 of the control unit 200. The value $n_2$ corresponds to 1 ms. Therefore, by decrementing the register value of the register-D 2024 by $n_2$, the pulse interval to be produced by the comparator 2030 is gradually decreased.

In the above-mentioned operation, since engine is not knocking heavily and the register value of the register-D 2024 is larger than $N_1$, the engine condition is recognized as immediately after the end of heavy engine knocking. As set forth with respect to FIG. 26, in this condition, the pulse interval of the ignition signal $S_9$ is gradually decreased to improve drivability.

If the register value in the register-D 2024 is not larger than $N_1$, i.e., it is equal to $N_1$, the register-C 2022 is set to the preset value $M_1$ and the register-D 2024 is set to the preset value $N_1$. Since, in this condition, heavy engine knocking does not occur, the pulse interval for fail-safe operation is maintained at the preset value. On the other hand, if heavy engine knocking is detected at the block $P_{14}$, the mode selection register 2016 is set to MODE 2, at a block $P_{19}$, the register-C 2022 is set to the preset value $M_1$ and the register-D 2024 is set to the value $N_1 + n_1$. Here, the value $n_1$ corresponds to a pulse interval of approximately 20 ms. Therefore, the register value in the register-D 2024 will be about 23 ms. Thus, the pulse interval which defines the period of the occurrence of spark ignition is increased. As will be appreciated, since the engine is knocking heavily and thus the spark retard is required, the increase of the pulse interval is intended to reduce the possibility of causing spark ignition at a crank shaft angular position significantly advanced from top dead center.

Figure 24:
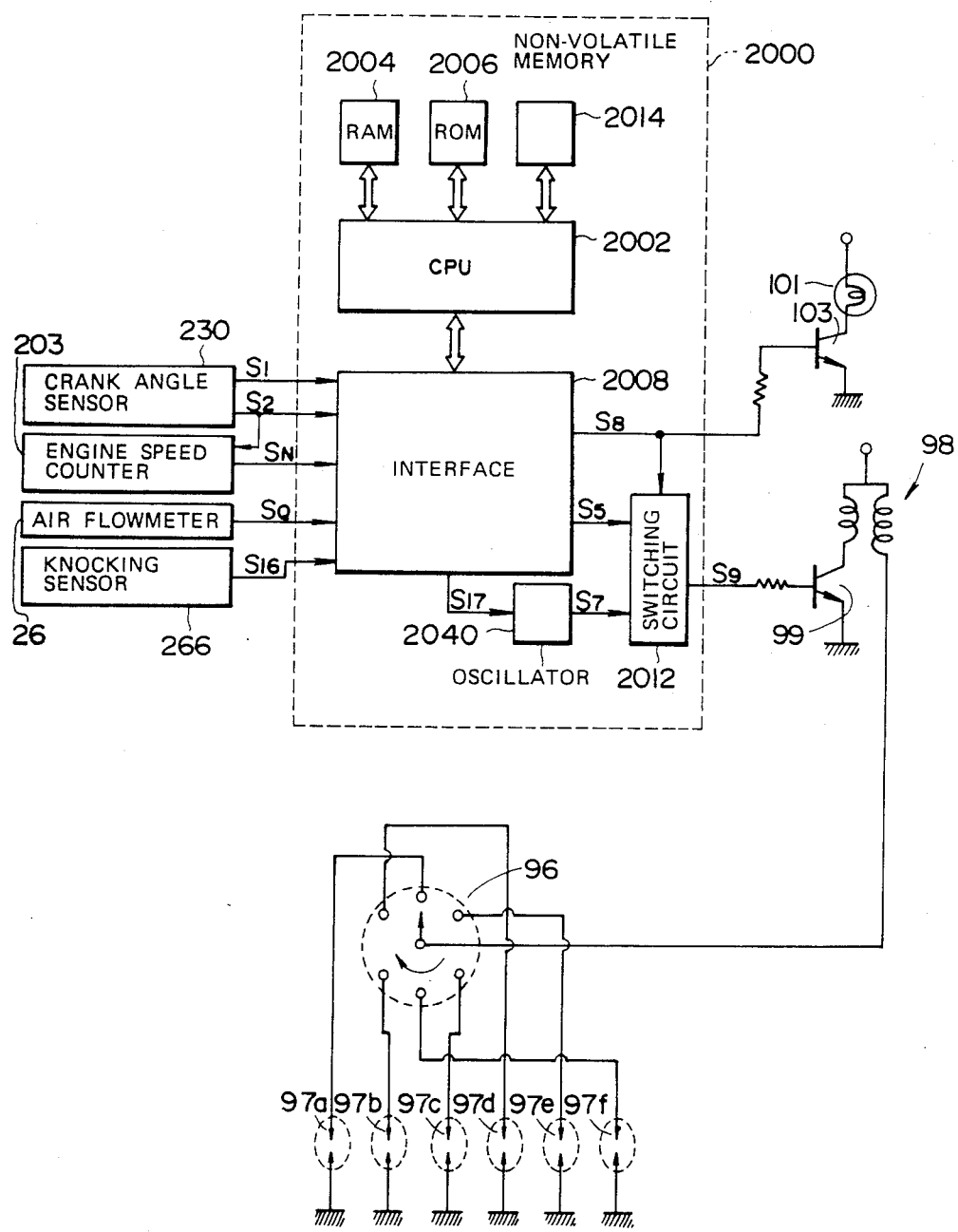
FIG. 24 is a block diagram of the ignition control system as a modification of the first embodiment of FIG. 3.
Figure 25:
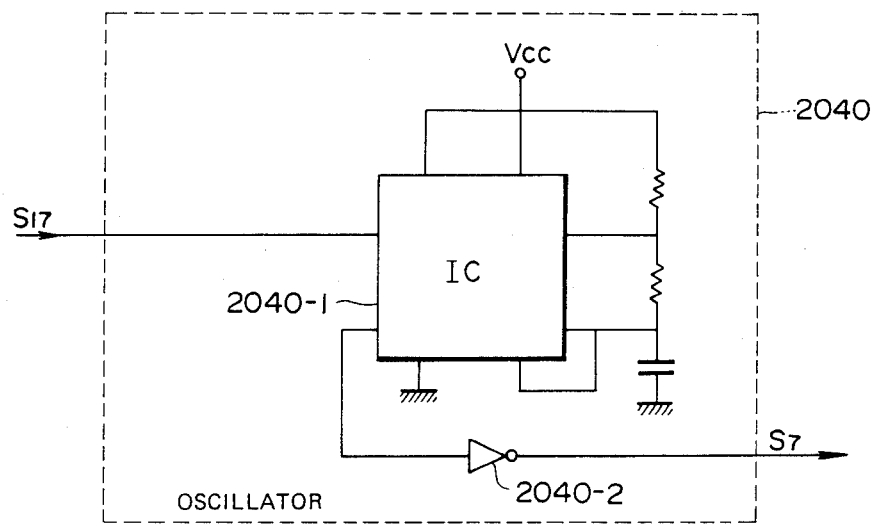
FIG. 25 is a circuit diagram of the oscillator used in the ignition control system of FIG. 24.

It should be appreciated, since the control unit 2000 per se performs the above-mentioned fail-safe operation, the oscillator 2010 and switching circuit 2012 in FIG. 24 can be omitted and the interface should be arranged as illustrated in FIG. 28.

Figure 29:
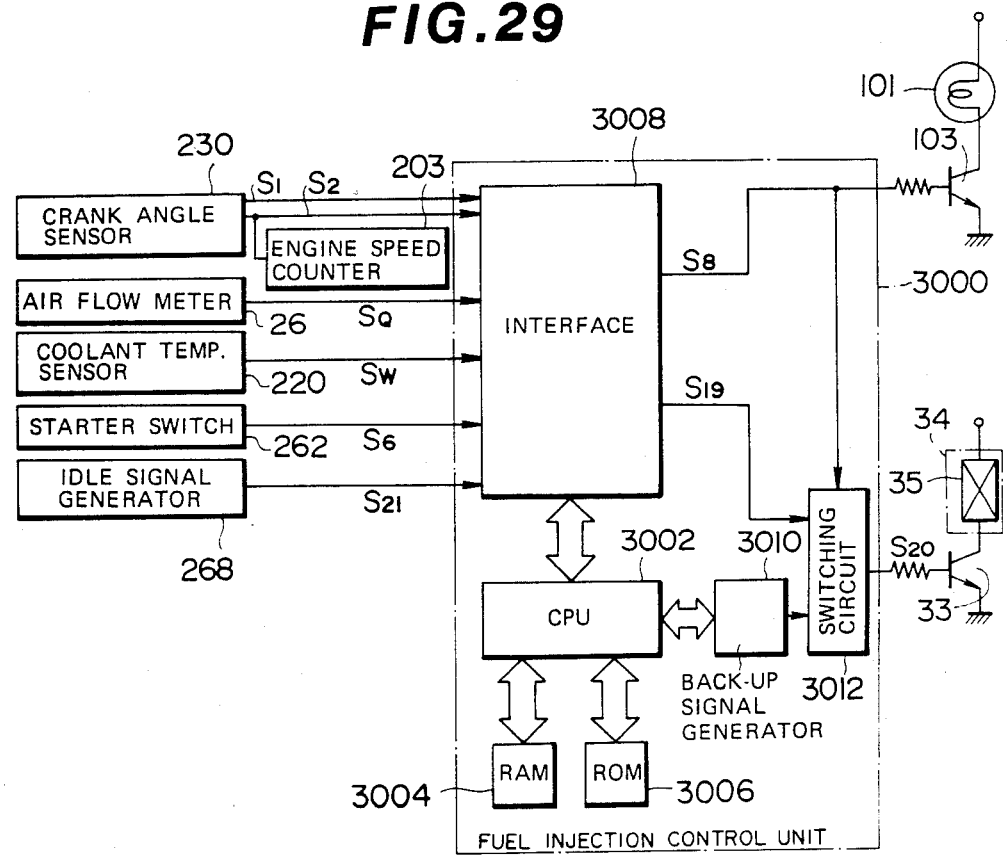
FIG. 29 is a block diagram of a fuel injection control system which incorporates the third embodiment of the fail-safe system according to the present invention.

Referring now to FIG. 29, there is illustrated a fuel injection control system incorporating the fail-safe system according to the present invention. This shows another application of the fail-safe system of the invention as the third embodiment of the invention. In order to avoid confusion among complicated reference numerals, the circuit elements functioning similarly to the foregoing first and second embodiments are represented by the same reference numerals.

A fuel injection control unit 3000 generally comprises a microcomputer including a CPU 3002, a RAM 3004, a ROM 3006 and an interface 3008. In the fuel injection control process, the fuel injection pulse duty cycle is determined on the basis of various control parameters such as the engine speed, engine load condition, engine coolant temperature condition and so forth. A general fuel injection control has been disclosed in the British Prepublication No. 2,037,458, published July 9, 1980, and the U.S. Pat. No. 4,319,327, issued Mar. 9, 1982. The disclosure of these citations are hereby incorporated by reference.

Fuel injection pulse duty cycle is generally determined from the following equation:

$$T_i = T_p \times C \times T_s$$

where
$T_i$ is a fuel injection quantity depending on which the fuel injection pulse duty cycle is determined;
$T_p$ is the basic fuel injection quantity calculated from $T_p = K \times Q \times Q/N$ (K: constant, Q=engine load, N=engine speed);
C is a correction value determined on the basis of selected correction parameters such as the engine coolant temperature; and
$T_s$ is a correction value derived from the battery voltage.

The foregoing arithmetic operation for determining the fuel injection amount and thus determining the fuel injection pulse duty cycle is carried out in synchronism with the engine revolution. To synchronize the control operation, the crank reference signal $S_1$ is used. Also, the fuel injection timing is controlled with reference to the crank reference signal $S_1$ and the crank position signal $S_2$. Therefore, if the crank angle sensor 230 fails and thus either the crank reference signal $S_1$ or the crank position signal $S_2$ is absent, the fuel injection control becomes impossible to perform.

As in the foregoing first and second embodiments, the absence of the crank reference signal $S_1$ and/or the crank position signal $S_2$ is detected by the fuel injection control unit 3000. When either one or both of the crank reference signal $S_1$ and the crank position signal $S_2$ is absent, the CPU 2002 feeds a fault signal $S_8$ through the interface 2008 to the fault indicator 101 via a switching transistor 103. In response to the fault signal $S_8$, the switching transistor 103 turns ON to illuminate the fault indicator 101. In addition, the fault signal $S_8$ is fed to a switching circuit 3012. The switching circuit 3012 is, in turn, connected to a back-up signal generator 3010 to receive therefrom a back-up signal $S_{18}$. In normal operation, the switching circuit 3012 transmits a pulse signal S19 produced by the fuel injection control unit 3000 and fed thereto via the interface 3008. The switching circuit 3012 is responsive to the fault signal S8 to transmit the back-up signal S18 in place of the signal S19. As will be appreciated, the signal outputted from the switching circuit 3012 will serve as the fuel injection pulse S20 to be fed to the actuator 35 of the fuel injector 34 via a switching transistor 33. The fuel injection pulse S20 defines the duty cycle of the actuator 35.

Figure 30:
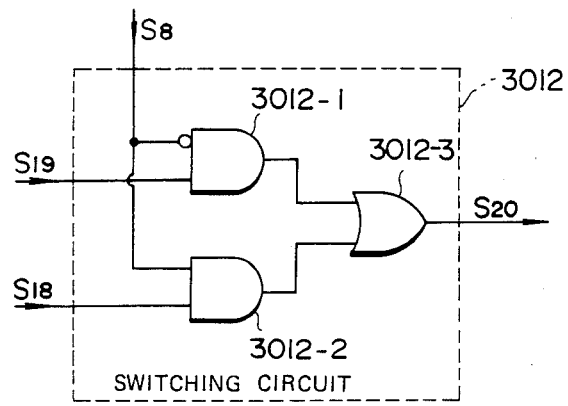
FIG. 30 is a circuit diagram of a switching circuit in the fuel injection control system of FIG. 29.

As in the foregoing switching circuit of FIG. 10, the switching circuit 3012 comprises AND gates 3012-1 and 3012-2, and an OR gate 3012-4, as shown in FIG. 30. The AND gate 3012-1 is connected to the interface 3008 of the microcomputer via an inverting input terminal to receive the inverted fault signal $S_8$. Therefore, a HIGH level signal is applied to the inverting input terminal of AND gate 3012-1 as long as the fault signal $S_8$ remains LOW. The fault signal $S_8$ is also fed to the one of the input terminals of the other AND gate 3012-2. The other input terminal of the first AND gate 3012-1 is also connected to the interface 3008 to receive therefrom the pulse signal $S_{19}$. The other input terminal of the AND gate 3012-2 is connected to the oscillator 3010 to receive the pulse signal $S_{18}$.

The AND gate 3012-1 is responsive to the pulse signal $S_{19}$ as long as the fault signal $S_8$ remains LOW to transmit the pulse signal $S_{18}$ as the fuel injection signal $S_{20}$. If failure of the crank angle sensor 230 is detected, the fault signal $S_8$ goes HIGH to close the AND gate 3012-1 and open the AND gate 3012-2. In this case, the pulse signal $S_{18}$ produced by the back-up signal generator 3010 is outputted as the fuel injection signal $S_{20}$.

On the other hand, the back-up signal generator 3010 is generally adapted to produce a pulse train $S_{18}$ with a predetermind period and a constant duty cycle and comprises a clock generator 3010-1 for producing clock pulses $S_{22}$ at a constant frequency, a counter 3010-2 connected to the clock generator 3010-1 for counting the clock pulses $S_{22}$, and comparators 3010-3 and 3010-5. The comparator 3010-3 is adapted to compare the counter value of the counter 3010-2 to the value of a signal fed from a period register 3010-4 which holds a value representative of the determined pulse period from the CPU 3002. The comparator 3010-5 is adapted to compare the counter value to the value of a signal from a duty register 3010-7 which holds a value representative of the determined duty cycle from the CPU 3002. The comparators 3010-3 and 3010-5 are respectively connected to RESET and SET input terminals of a flip-flop 3010-6. As will be apparent, the flip-flop 3010-6 is set in response to the comparator signal $S_{24}$ from the comparator 3010-5 and is reset in response to the comparator signal $S_{23}$ from the comparator 3010-3.

Figure 32:
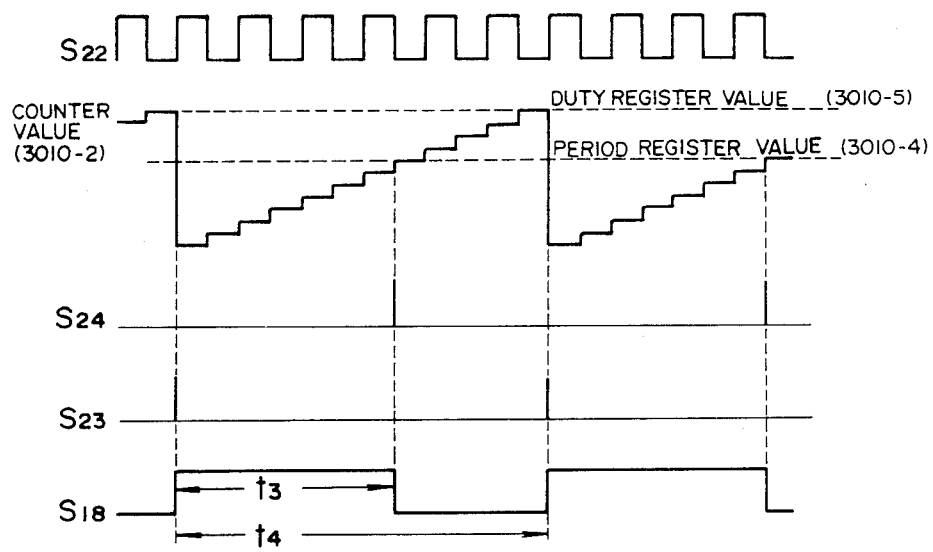
FIG. 32 is a timing chart showing the function of the back-up circuit of FIG. 31.

The variation of the respective signals is illustrated in FIG. 32. As shown in FIG. 32, the comparator signal $S_{23}$ defines the rising edge of the pulse train $S_{18}$ and the comparator signal $S_{24}$ defines the trailing edge of the pulse train. Therefore, the interval $t_3$ between the comparator signals $S_{23}$ and $S_{24}$ corresponds to the pulse duration of the pulse train $S_{18}$ and the period $t_4$ of the comparator signal $S_{23}$ defines the pulse period of the signal $S_{18}$.

In practice, the duty cycle of the pulse train $S_{18}$ is variable in accordance with the variation of the intake air flow rate. In order to adjust the duty cycle according to the variation of the intake air flow rate, the CPU 3002 adjusts the values of the period register 3010-4 and the duty register 3010-7 which cooperatively define the duty cycle of the pulse train $S_{18}$. This is intended to minimize engine surge, i.e., cycle-to-cycle fluctuation and engine torque fluctuation.

Figure 33:
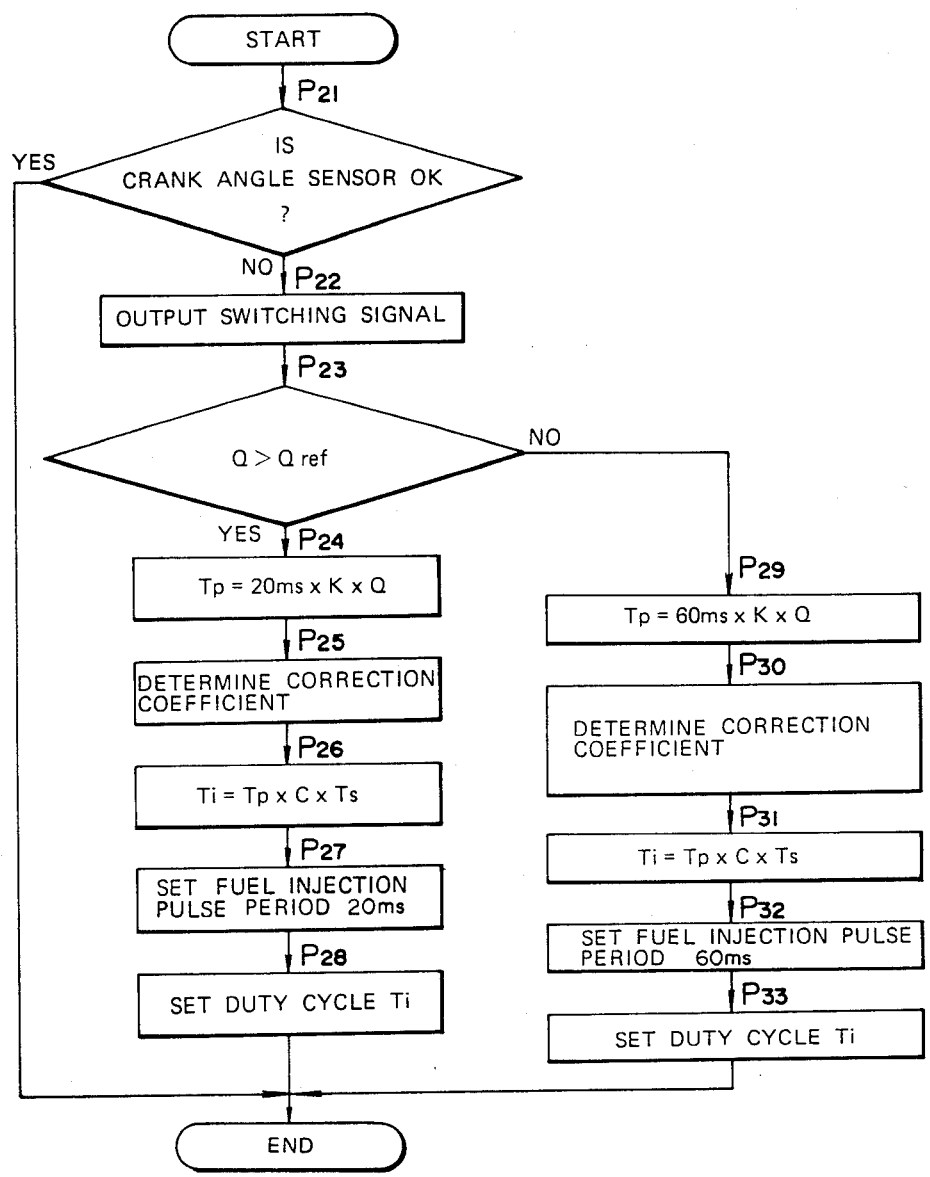
FIG. 33 is a flow chart of a fail-safe program in the fuel injection control in the fuel injection control system of FIG. 29.

As in the foregoing first and second embodiments, the fail-safe operation in response to failure of the crank angle sensor can be performed by a fail-safe program stored in the ROM 3006. FIG. 33 shows an example of the fail-safe program for the fuel injection control system according to the present invention. In the shown flowchart, the presence of the crank reference signal $S_1$ and the crank position signal $S_2$ is checked in order to monitor the crank angle sensor 230, at a block $P_{21}$. If the crank angle sensor is detected to be operating normally, i.e., the answer at block $P_{21}$ is YES, the fail-safe programs ENDs and the normal fuel injection control program will be executed by the CPU 3002. On the other hand, if the answer at block $P_{21}$ is NO, then, a switching signal is produced by the CPU to switch the operational mode of the interface 3008 to fail-safe mode, at a block $P_{22}$. Thereafter, at a block $P_{23}$, the air flow rate Q indicated by the air flow meter signal $S_Q$ is compared to a reference value $Q_{ref}$ prestored in the RAM 3004. At a block $P_{24}$ if the air flow rate Q is larger than the reference value $Q_{ref}$, the basic fuel injection quantity $T_p$ is derived from the equation:

$$T_p = 20 \text{ ms} \times K \times Q$$

where K is a constant coefficient determined for each specific engine.

Figure 31:
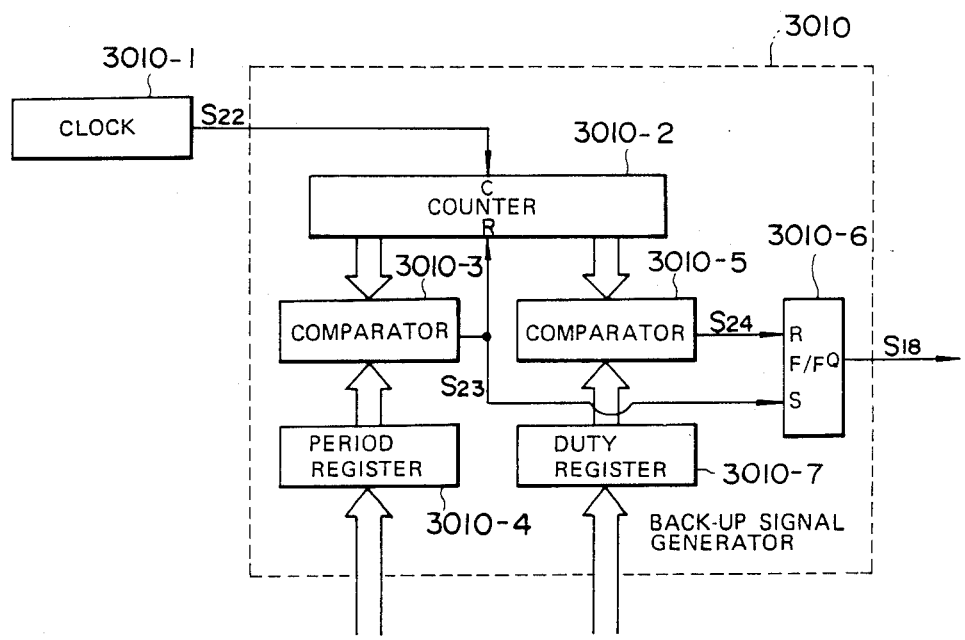
FIG. 31 is a block diagram of a back-up circuit in the fuel injection control system of FIG. 29.

The basic fuel injection quantity $T_p$ is corrected by a correction coefficient C determined on the basis of preselected correction parameters at a block $P_{25}$, such as engine coolant temperature signal value $S_w$, starting enrichment, acceleration enrichment and so forth. The basic fuel injection quantity as corrected by the correction coefficient C is further corrected by another correction coefficient $T_s$ determined in accordance with the battery voltage at the block $P_{25}$. The correction of the basic fuel injection amount $T_p$ is performed at a block $P_{26}$. Thereafter, a duty register 3010-7 in FIG. 31 is set to 20 ms as the fuel injection pulse period, at a block $P_{27}$ and the period register 3010-4 is set to the value $T_i$ obtained at the block $P_{26}$, at a block $P_{28}$.

On the other hand, if the intake air flow Q rate is not larger than the reference value $Q_{ref}$ and thus the answer at the block $P_{23}$ is NO, the basic fuel injection amount is derived from:

$$T_p = 60 \text{ ms} \times K \times Q$$

at a block $P_{29}$. Then, correction coefficient C is determined, at a block $P_{30}$ on the basis of the engine coolant temperature $S_w$, starting enrichment, acceleration enrichment and so forth. Then, at a block $P_{31}$, the basic fuel injection quantity is corrected by the correction coefficient C and the other correction coefficient $T_s$ determined on the basis of the battery voltage, from the following equation:

$$T_i = T_p \times C \times T_s$$

The duty register 3010-7 (in FIG. 31) is set to 60 ms and the period register 3010-4 is set to $T_i$ at respective blocks $P_{32}$ and $P_{33}$.

It will be appreciated that in the embodiment described hereabove, the period of the fuel injection pulses varies between two values, i.e., 20 ms and 60 ms, depending on the air flow rate, i.e., the load condition on the engine. Thus, even if the crank angle sensor fails, fuel injection can comply with variations of the engine operating conditions. Preferably, the period of the fuel injection pulses used in the fail-safe operation may vary according to the acceleration or deceleration of the engine speed detected by differentiating the air flow rate fluctuation at a given time. It is also possible to continuously adjust the set period, inproportion to the variation of the air flow rate. Furthermore, it is possible to adjust the fuel injection pulse period in response to an idling signal $S_{21}$ produced by an idle signal generator 268 (FIG. 29) as the engine is in idling condition. The idle signal genererator 268 may be a throttle-closed-position detector or other appropriate detector for detecting the engine idling condition. The fuel injection pulse period will be increased in response to the idling signal $S_{21}$.

Preferably, hysteresis may be provided in variation of the fuel injection pulse period in order to prevent hunting.

Figure 34:
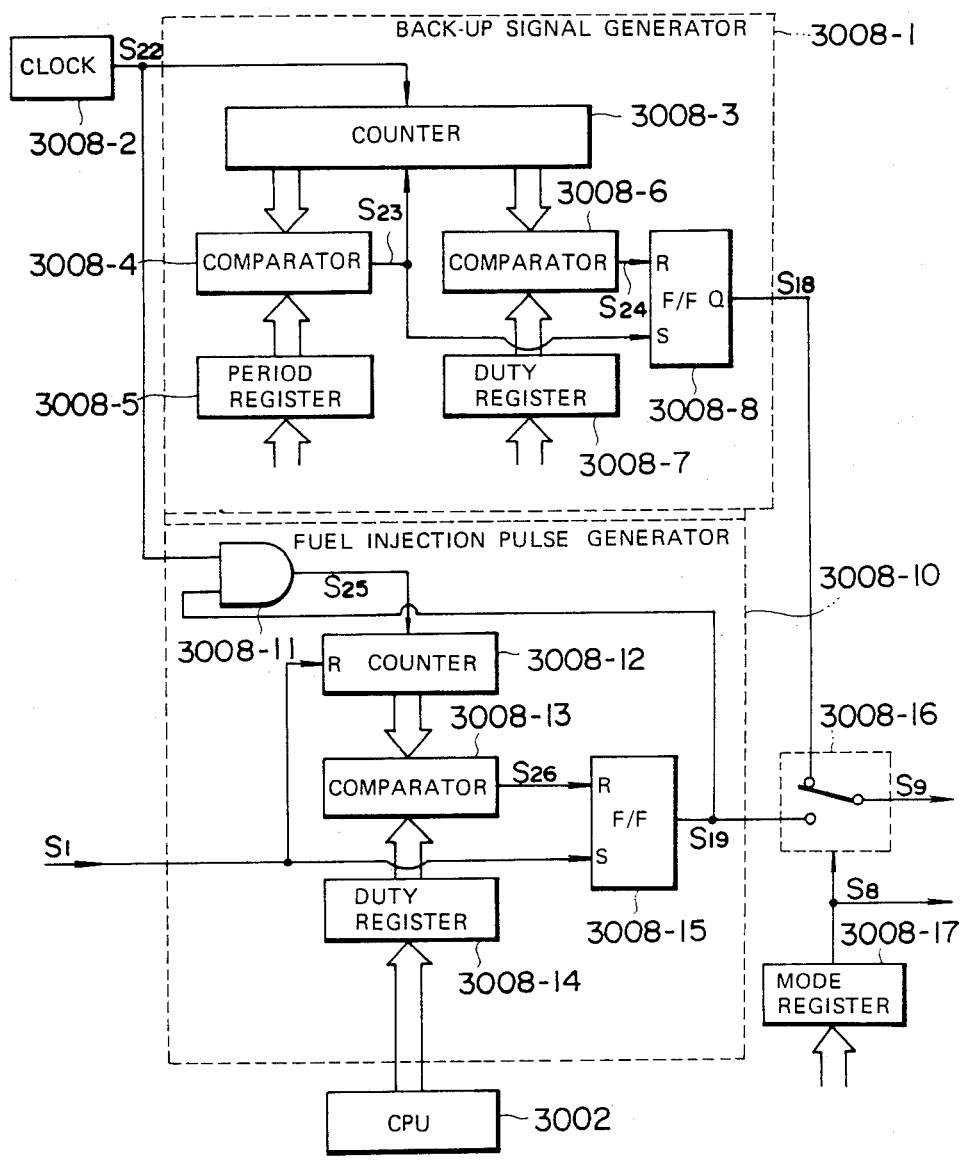
FIG. 34 is a block diagram of the interface in the control unit of the fuel injection control system of FIG. 29.

In the foregoing fail-safe operation, the back-up signal generator 3010 and the switching circuit 3012 are provided separately from the usual microcomputer components. However, the back-up signal generator and the switching circuit may be incorporated within the interface of the microcomputer. FIG. 34 shows the detail of the interface 3008 incorporating sections respectively functioning as the back-up signal generator 3008-1 and a fuel injection pulse generator 3008-10. As will be appreciated, the back-up signal generator 3008-1 has substantially the same structure as that illustrated in FIG. 31. As in the former back-up signal generator, the back-up signal generator 3008-1 is generally adapted to produce a pulse train $S_{18}$ with a predetermined period and a constant duty cycle and comprises a clock generator 3008-2 for producing clock pulses $S_{22}$ at a constant frequency, a counter 3008-3 connected to the clock generator 3008-2 for counting the clock pulses $S_{22}$, and comparators 3008-4 and 3008-6. The comparator 3008-4 is adapted to compare the counter value of the counter 3008-3 to the value of a signal from a period register 3008-5 which holds a value representative of the determined pulse period from the CPU 3002. The comparator 3008-6 is adapted to compare the counter value to the value of a signal from a duty register 3008-7 which holds a value representative of the determined duty cycle by the CPU 3002. The comparators 3008-4 and 3008-6 are respectively connected to RESET and SET input terminals of a flip-flop 3008-8. As will be appreciated, the flip-flop 3008-8 is set in response to the comparator signal $S_{24}$ from the comparator 3008-6 and is reset in response to the comparator signal $S_{23}$ from the comparator 3008-4.

Figure 35:
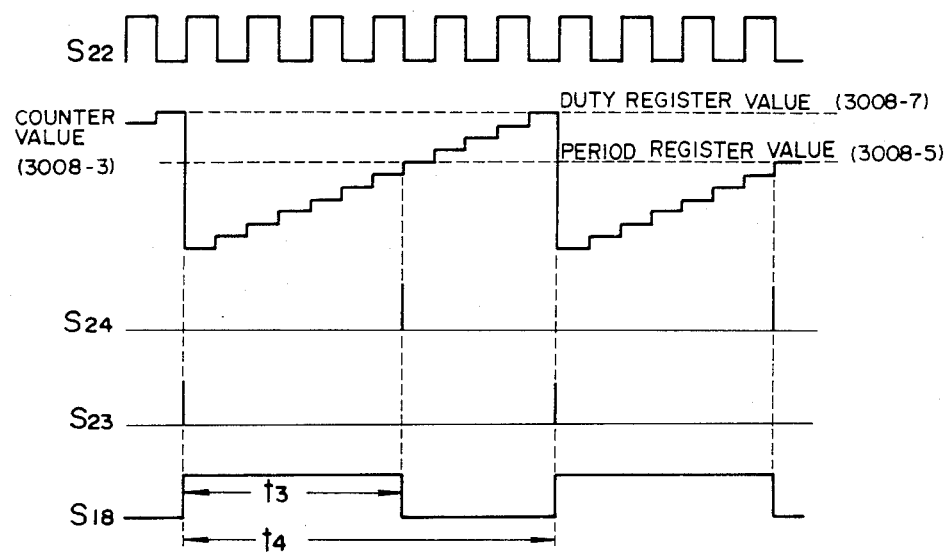
FIG. 35 is a timing chart showing the function of the back-up circuit in the interface of FIG. 34.

The variation of the various signals are illustrated in FIG. 35. As shown in FIG. 35, the comparator signal $S_{23}$ defines the rising edge of the pulse train $S_{18}$ and the comparator signal $S_{24}$ defines the trailing edge of the pulse train. Therefore, the interval $t_3$ between the comparator signal $S_{23}$ and $S_{24}$ corresponds to the pulse duration of the pulse train and the interval $t_4$ between the comparator signal pulses $S_{23}$ defines the pulse period.

In practice, the duty cycle of the pulse train $S_{18}$ is variable depending upon the variation of the intake air flow rate. To vary the duty cycle according to the variation of the intake air flow rate, the CPU 3002 determines the values of the period register 3008-5 and the duty register 3008-7 which cooperatively define the duty cycle of the pulse train $S_{18}$. This is intended to minimize the engine surge, i.e., cycle-to-cycle fluctuation and engine torque fluctuation.

The fuel injection pulse generator 3008-10 comprises a counter 3008-12, a comparator 3008-13 adapted to compare the counter value of the counter 3008-12 with the value in a duty register 3008-14 which receives a value representative of the determined duty cycle of the fuel injection pulse from the CPU 3002. The comparator 3008-13 is connected to a RESET input terminal of a flip-flop 3008-15 which is adapted to receive the crank referecence signal $S_1$ from the crank angle sensor 230 at its SET input terminal.

Figure 36:
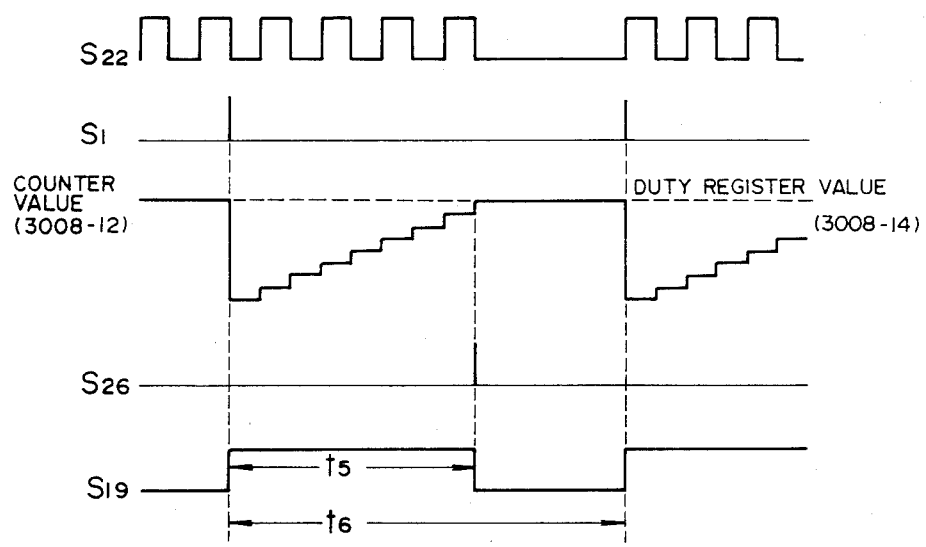
FIG. 36 is a timing chart showing the function of the fuel injection pulse generator in the interface of FIG. 34.

The counter 3008-12 also receives the crank reference signal $S_1$ at its RESET input terminal and is connected to the output terminal of an AND gate 3008-11. The AND gate 3008-1 is connected to the clock generator 3008-2 to receive therefrom the clock pulses $S_{22}$ and to the output terminal of the flip-flop 3008-15 to receive therefrom the pulse train $S_{19}$. Therefore, the AND gate 3008-11 transmits the clock pulse signal $S_{22}$ as long as the flip-flop 3008-15 remains SET and thus the pulse train $S_{19}$ is HIGH, as shown in FIG. 36. The comparator 3008-13 produces a HIGH level comparator signal $S_{26}$ when the counter value of the counter 3008-12 reaches the register value in the duty register 3008-14 to reset the flip-flop 3008-15. The counter 3008-12 is reset in response to the crank reference signal $S_1$.

The pulse train $S_{19}$ produced by the flip-flop 3008-15 and the pulse train $S_{18}$ produced by the flip-flop 3008-8 are fed to a mode selector switch 3008-16. The mode selector switch 3008-16, is, in turn, connected to the CPU 3002 to receive the fault signal $S_8$. As long as the fault signal $S_8$ is absent, the mode selector switch 3008-16 is biased toward the terminal connected to the flip-flop 3008-15. In this mode, the fuel injection control is performed in normal mode and fuel injection pulses determined in accordance with the preselected control parameters are outputted to control the fuel injection quantity. Alternatively, if the fault signal $S_8$ is outputted by the CPU, the mode selector switch 3008-16 is switched to connect its terminal to the flip-flop 3008-8 in order to transmit the pulse train $S_{18}$ therethrough. In this operational mode, the fuel injection control is performed via the back-up signal generator 3008-1. As will be appreciated, the pulse train $S_{19}$ is outputted to the fuel injector 34 as the fuel injection pulse in the normal control mode and the pulse train $S_{18}$ is outputted as the fuel injection signal $S_9$ in the fail-safe mode.

Figure 37:
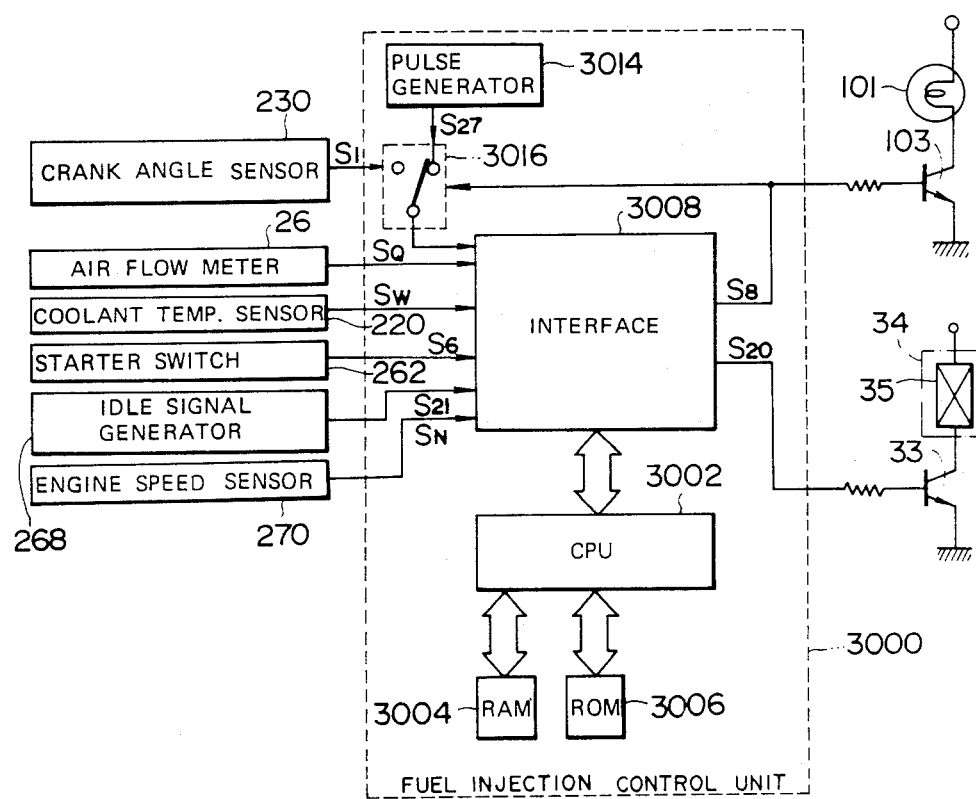
FIG. 37 is a block diagram of a modification of the fuel injection control system of FIG. 29.

FIG. 37 shows a modification of the third embodiment. In this modification, a switch 3016 is inserted between the crank angle sensor 230 and the interface 3008 of the control unit 3000. The coantact of the switch 3016 connected to the crank angle sensor 230 can be moved into contact with the output terminal of a pulse generator 3014 which outputs a fixed-frequency pulse train $S_{27}$. The switch 3016 normally establishes communication between the crank angle sensor 230 and the interface and is responsive to the fault signal $S_8$ from the CPU 3002 via the interface 3008 to connect the interface to the pulse generator 3014. In the normal mode, the control unit 3000 thus receives the crank reference signal $S_1$ via the switch 3016 and, in fail-safe mode, receives the pulse train $S_{27}$ from the pulse generator 3014. Therefore, the pulse train $S_{27}$ should have a pulse period substantially corresponding to the crank reference signal $S_1$ in order to serve as a replacement for the crank reference signal.

In the shown embodiment, an engine speed sensor 270 is employed to replace the engine speed counter of the foregoing embodiments. The engine speed sensor 270 detects engine revolution speed and produces an engine speed signal $S_N$ having a value proportional to the engine speed.

As will be appreciated, according to this embodiment, fail-safe operation is performed by substituting clock pulses from lthe pulse generator for the crank angle sensor as an engine revolution parameter source. Therefore, the fuel injection control method in the control unit 3000 need not be changed between normal control mode and the fail-safe mode.

Preferably, the pulse generator 3014 may be associated with the CPU 3002 to receive a signal indicative of engine operating conditions via the interface 3008, as illustrated in phantom line. The pulse period of the pulse train $S_{27}$ of the pulse generator 3014 may vary depending on the engine operating conditions as indicated in the signal from the CPU. In this way, the fuel injection control even during the fail-safe operation may comply with the variation of the engine operating conditions. The signal indicating the engine operating conditions may be, for example, the idling signal $S_{21}$ from the idle signal generator, the air flow meter signal $S_Q$ from the air flow meter 26, or the like.

Figure 38:
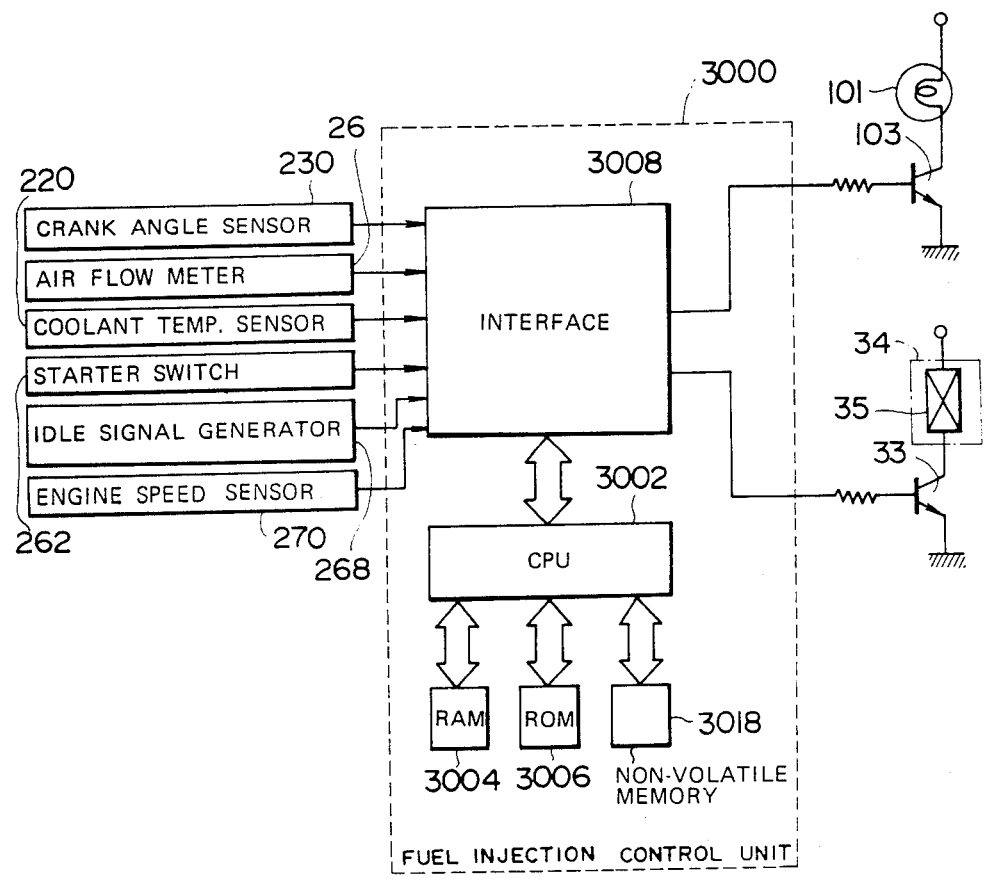
FIG. 38 is a block diagram of another modification of the fuel injection control system of FIG. 29.

FIG. 38 shows another modification of the third embodiment. In this modification, a non-volatile memory 3018 is included in the control unit 3000. The non-volatile memory comprises, for example, MNOS, EE-PROM or CMOS RAM with a back-up power supply and is adapted to store an error-flat datum, when the crank angle sensor malfunctions, even after the main engine power supply is turned off. The data in the non-volatile memory 3018 can be checked during maintenance at a service center.

It will be appreciated that, this modification can be applied to any of the foregoing embodiments.

Figure 39:
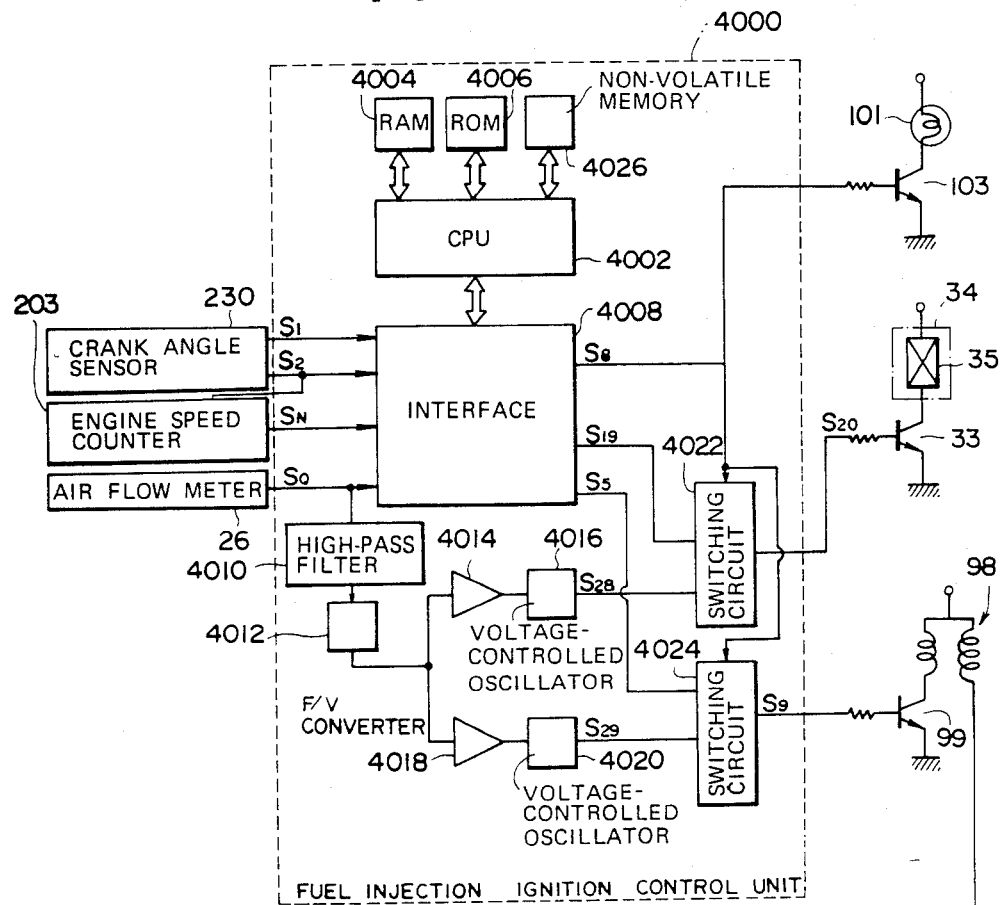
FIG. 39 is a block diagram of a fuel injection/ignition control system for an internal combustion engine, which incorporates the fourth embodiment of the fail-safe system according to the present invention.

FIG. 39 shows the fourth embodiment of the fail-safe system according to the present invention, which is applied to an engine control system 4000 for controlling both fuel injection and spark ignition. The respective control operations for fuel injection and spark ignition under normal crank angle sensor operation will be performed as set forth previously and in per se well known manner. In this system, the control unit 4000 comprises a microcomputer consisting generally of the CPU 4002, the RAM 4004, the ROM 4006 and the interface 4008. The ROM 4006 stores the fuel injection control program and the spark ignition control program which are executed in the CPU 4002 on a time-share basis and in synchronism with the engine revolution.

The crank angle sensor 230 producing the crank reference signsl $S_1$ and the crank position signal $S_2$, the engine speed counter 203 producing the engine speed signal $S_N$, and the air flow meter 26 producing the air flow meter signal $S_Q$ having a value proportional to the intake air flow rate are all connected to the interface 4008 of the control unit 4000 to input the mentioned signals.

Th control unit 4000 further incorporates a fail-safe system which comprises a high-pass filter 4010, a frequency-to-voltage converter 4012, amplifiers 4014 and 4018, voltage-controlled oscillators 4016 and 4020 and switching circuits 4022 and 4024. The high-pass filter 4010 is adapted to filter the pulsatile component of the air flow meter signal $S_Q$ to produce a signal having a frequency proportional to the intake air flow rate. The signal from the high-pass filter 4010 is fed to the frequency-to-voltage converter 4012 to produce a signal having a voltage corresponding to the air flow rate representative of the load on the engine.

Figure 40:
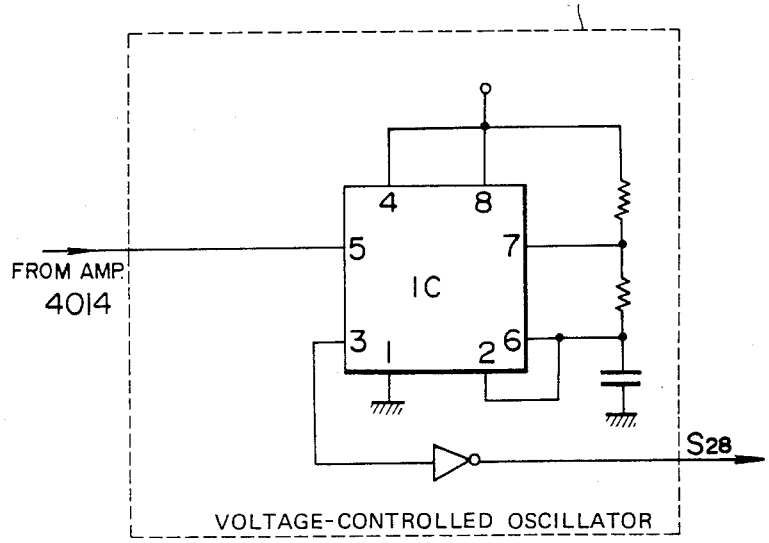
FIG. 40 is an illustration of a voltage-controlled oscillator in the fail-safe system of FIG. 39.
Figure 41:
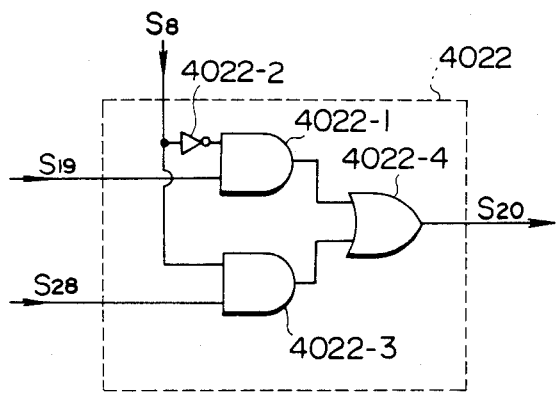
FIG. 41 is a circuit diagram of the switching circuit in the fail-safe system of FIG. 39.

The voltage signal from the frequency-to-voltage converter 4012 is fed to one of the voltage-controlled oscillator 4016 via one of the amplifiers 4014. The oscillator 4016 is adapted to produce a pulse train $S_{28}$ with a pulsewidth variable in accordance with the input voltage from the frequency-to-voltage converter 4012 via the amplifier 4014. As shown in FIG. 40, the voltage-controlled oscillator 4012 comprises, for example, an IC unit such as Signetics NE 555 which outputting a train of variable-width pulses $S_{28}$. Generally speaking, the pulse duration of the pulse train $S_{28}$ corresponds to the fuel injection pulse duration and the duty cycle thereof controls the operation of the actuator 35 of the fuel injection valve 34. The pulse train $S_{28}$ is outputted to a switching circuit 4022. As shown in FIG. 41, the switching circuit 4022 has identically the same construction as that illustrated in FIG. 10. The switching circuit 4022 includes an AND gate 4022-1 having one input terminal connected to the interface 4008 via the inverter 4022-2 to receive therefrom the fault signal $S_8$ when of the crank angle sensor is detected. The other input terminal of the AND gate 4022-1 is connected to the voltage-controlled oscillator 4016 to receive therefrom the pulse train $S_{28}$. An AND gate 4022-3 is also connected to the interface 4008 to receive therefrom the fault signal $S_8$ at one input terminal thereof. The other input terminal of the AND gate 4022-3 receives the pulse train $S_{19}$ indicative of the fuel injection quantity determined in the normal fuel injection control operation. The output terminals of both of the AND gates 4022-1 and 4022-3 are connected to an OR gate 4022-4 which output one of the pulse trains $S_{19}$ or $S_{28}$ as the fuel injection pulse $S_{20}$.

Figure 42:
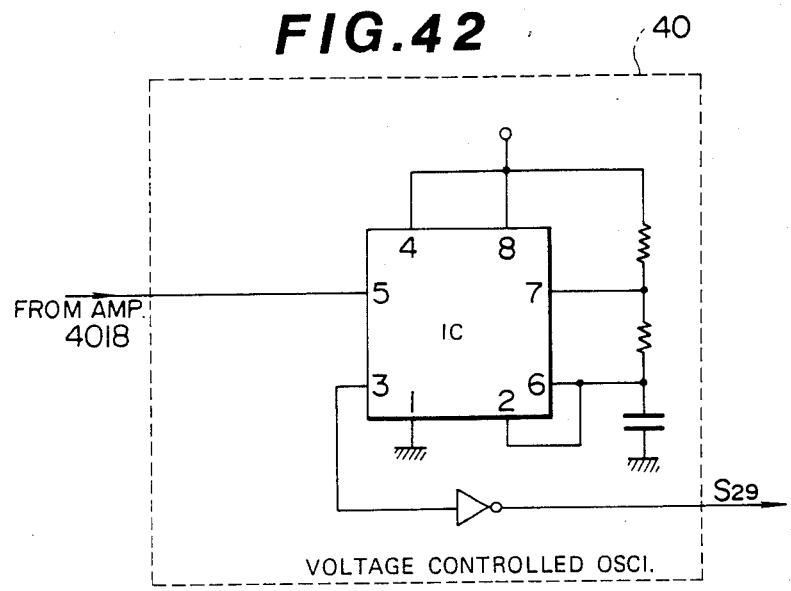
FIG. 42 is an illustration similar to FIG. 40 and showing another voltage-controlled oscillator in the fail-safe system of FIG. 39.
Figure 43:
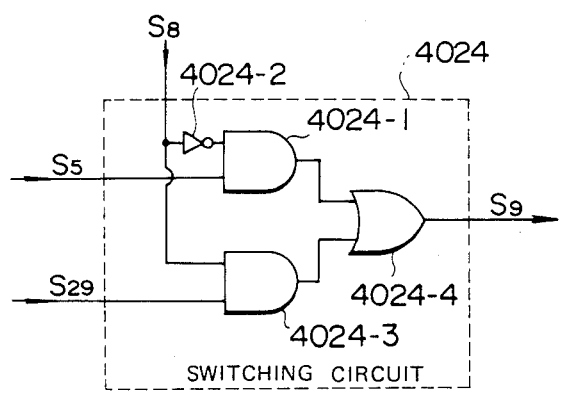
FIG. 43 is a circuit diagram similar to FIG. 41 and showing another switching circuit in the fail-safe system of FIG. 39.

The voltage signal from the frequency-to-voltage converter 4012 is also fed to the voltage-controlled oscillator 4020 via an amplifier 4018. The oscillator 4020 is adapted to produce a pulse train $S_{29}$ of variable pulse width reflecting the input voltage from the frequency-to-voltage converter 4020 via the amplifier 4018. As shown in FIG. 42, the voltage-controlled oscillator 4020 comprises, for example, the IC unit such as Signetics NE 555 which outputs a pulse train $S_{29}$ with a variable pulsewidth. The duty cycle of the pulse train $S_{29}$ controls both spark timing and spark dwell. The pulse train $S_{29}$ is fed to a switching circuit 4024. As shown in FIG. 43, the switching circuit 4024 includes an AND gate 4024-1 with one input terminal connected to the interface 4008 via an inverter 4024-2 to receive the fault signal $S_8$ when malfunction of the crank angle sensor is detected. The other input terminal of the AND gate 4024-1 is connected to the voltage-controlled oscillator 4020 to receive the pulse train $S_{29}$. An AND gate 4024-3 is also connected to the interface 4008 to receive the fault signal $S_8$ at one input terminal thereof. The other input terminal of the AND gate 4024-3 receives the pulse train $S_5$ indicative of the spark ignition timing determined by the normal spark ignition control system. The output terminals of both of the AND gates 4024-1 and 4024-3 are connected to an OR gate 4024-4 which outputs one of the pulse train $S_5$ or $S_{29}$ as the spark ignition signal $S_9$.

Figure 44:
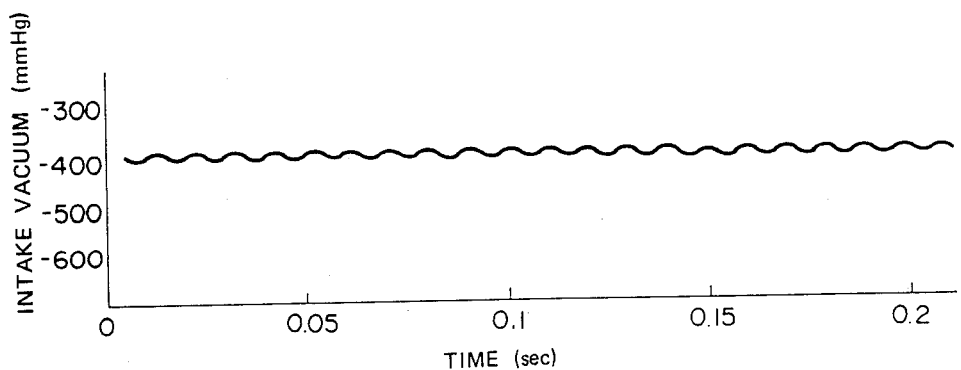
FIG. 44 shows an exemplary waveform of an air flow meter signal.
Figure 45:
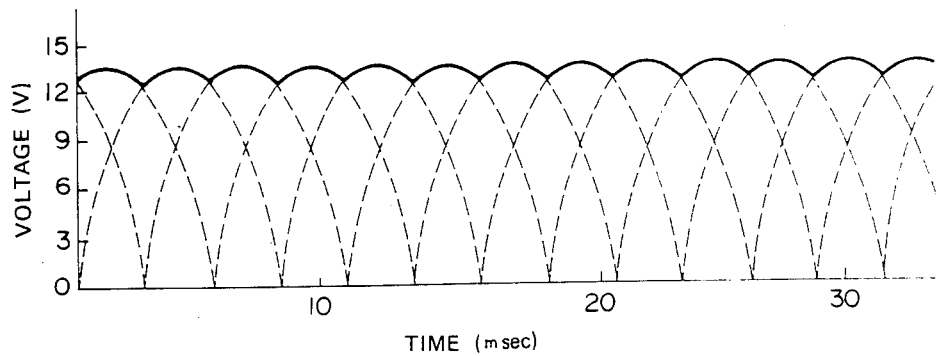
FIG. 45 shows the variation of power source voltage with engine revolution.

In the shown embodiment, the high-pass filter 4010 serves to produce a pulse signal with a frequency approximately proportional to the engine revolution speed. This can also be done by detecting the pulsatile variation of intake vacuum caused by the opening and closing of the intake valves of the engine cylinders. FIG. 44 shows the intake vacuum pressure variation. Also, the engine speed can be detected by detecting pulsatile battery voltage variation as shown in FIG. 45.

By detecting the engine revolution speed by means other than the crank angle sensor signals, the fail-safe operation can more accurately respond to changes in engine operating conditions than in the foregoing first to third embodiments.

Figure 46:
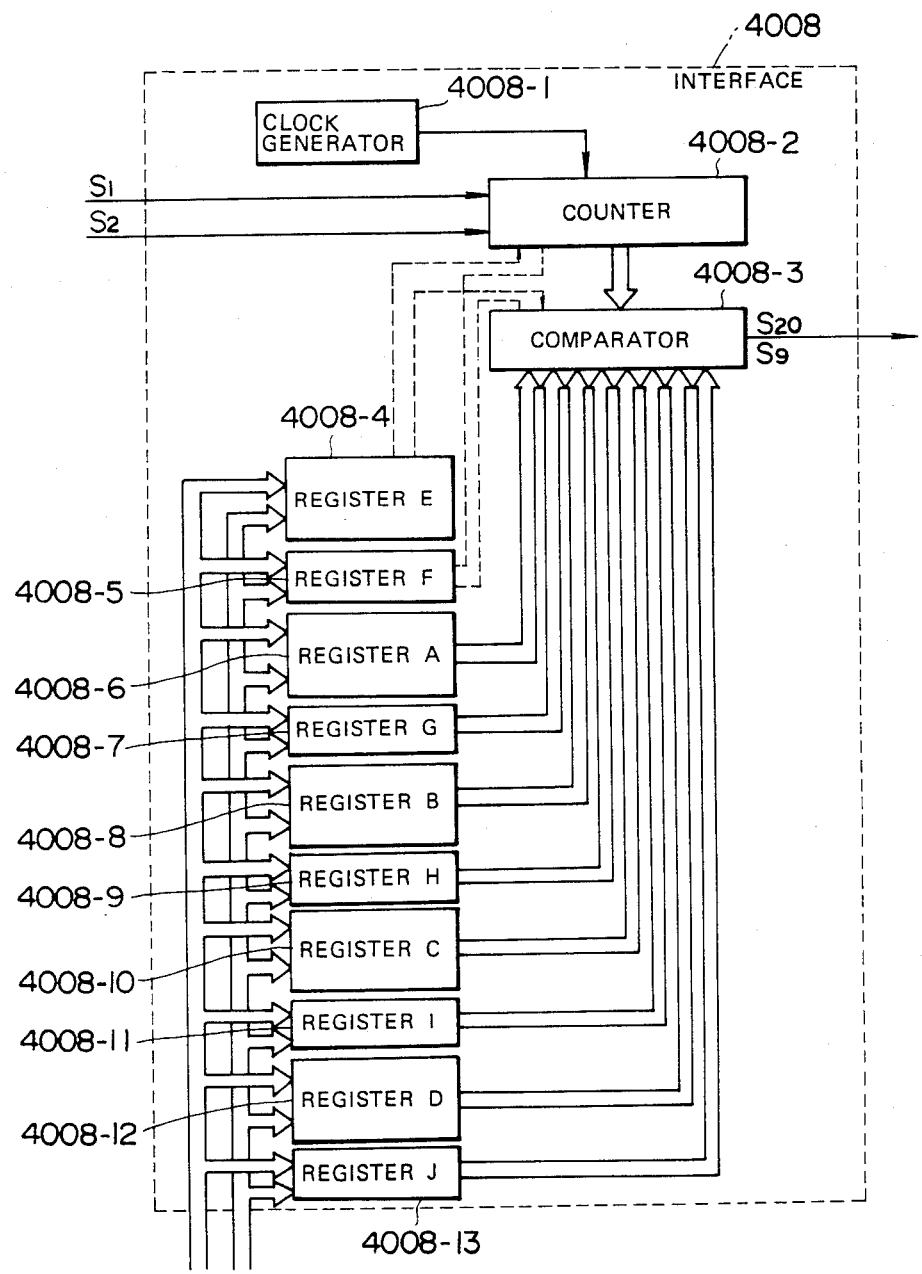
FIG. 46 is a block diagram of the interface in the control unit of the fuel injection/spark ignition control system of FIG. 39.
Figure 47:
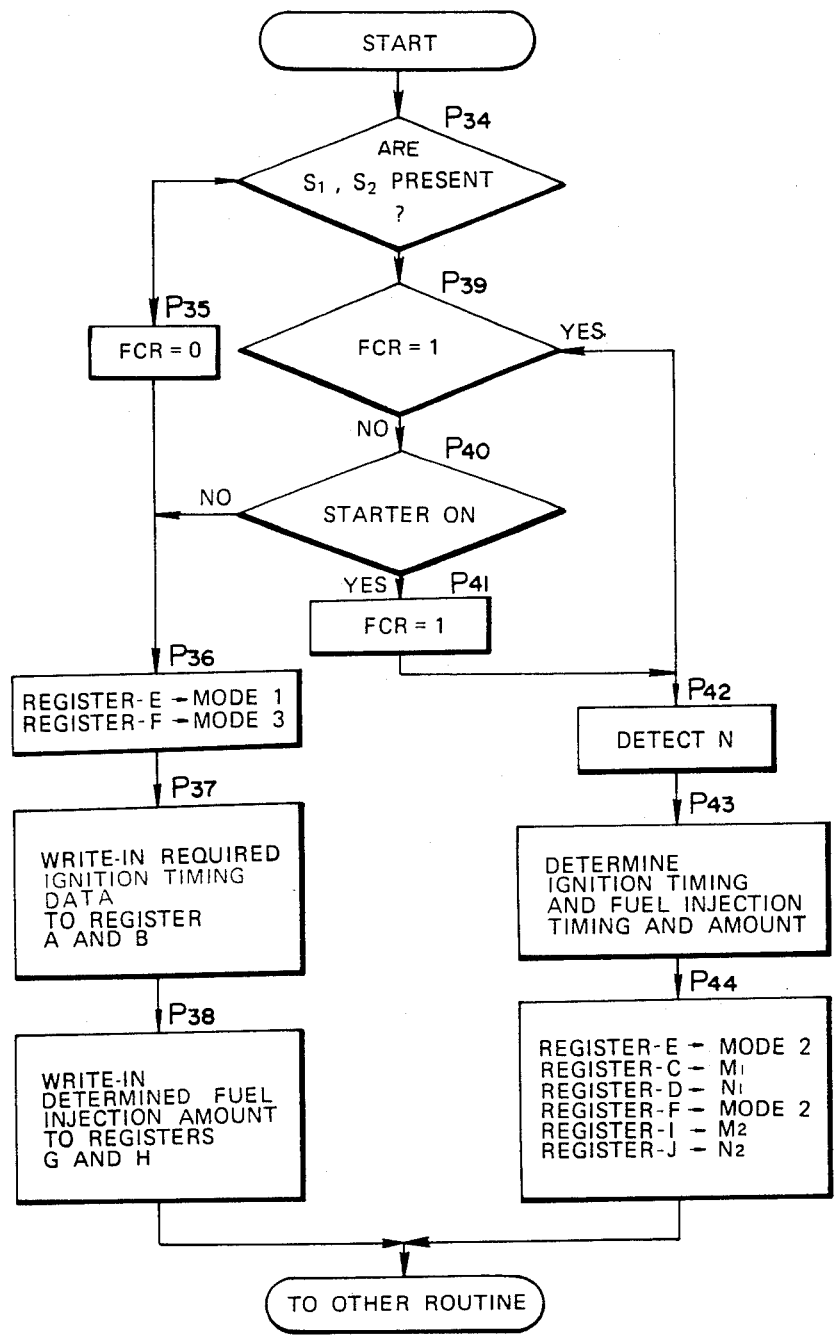
FIG. 47 is a flow chart of the fail-safe program to be executed by the control unit of FIG. 39.

As in the foregoing embodiments, a fail-safe program can be executed instead of using the fail-safe system as set forth previously. In this case, the interface 4008 is adapted to perform the fail-safe operation and produce the back-up signals for fuel injection control and spark ignition control. FIGS. 46 and 47 show this modification of the foregoing fourth embodiment, in which the interface 4008 is adapted to perform the fail-safe operation and the fail-safe program is stored in the ROM 4006 for execution at a predetermined suitable rate of repetition.

In FIG. 47, there is illustrated the fail-safe program for the fail-safe process according to the present invention. As in the fail-safe programs of FIGS. 16, 27 and 23, the presence of the crank reference signal $S_1$ and the crank position signal $S_2$ is checked at a block $P_{34}$. If both the crank reference signal $S_1$ and the crank position signal $S_2$ are present and thus the crank angle sensor 230 is working normally, the flag FCR is set to 0 at a block $P_{35}$. Then the mode registers-E and -F 4008-4 and 4008-5 are set respectively to MODE 1 and MODE 3, at a block $P_{36}$. MODE 1 represents normal spark ignition control, as described previously with reference to FIG. 16, and MODE 3 represents normal fuel injection control in which comparator 4008-3 is connected to registers G and H. Thereafter, spark ignition data representing the spark advance angle and spark dwell are written into the registers-A and -B 4008-6 and 4008-8, at a block $P_{37}$. The fuel injection control program data representing the desired fuel injection quantity is written into the registers-G and -H 4008-7 and 4008-9, at a block $P_{38}$.

The register values in the registers -A, -B, -G and -H are respectively compared, by a comparator 4008-3, to the counter value in a counter 4008-2. As described before, the counter 4008-2 is adapted to count the crank position signal pulses $S_2$ and output the counted value to the comparator 4008-3. The comparator 4008-3 may be controlled by the CPU 4002 on a timeshare basis in order to perform both fuel injection control and spark ignition control. As to the spark ignition control, as set forth with reference to FIG. 15, the comparator 4008-3 compares the counter value in the counter 4008-2 with the register values in the registers -A and -B 4008-6 and 4008-8 to produce a ignition signal $S_9$ with the determined advance angle and frequency adapted to the engine speed. On the other hand, as to the fuel injection control, the comparator 4008-3 compares the counter value with the register values in the registers -G and -H 4008-7 and 4008-9 to produce a fuel injection pulse $S_{20}$ with a determined duty cycle and pulse width.

Referring to FIG. 47, if either or both of the crank reference signal $S_1$ and the crank position signal $S_2$ are absent upon checking at the block $P_{34}$, then, the flag FCR is checked to see whether it has a value "1", at a block $P_{35}$. If NO, the starter switch position is checked at a block $P_{40}$. If the starter switch is OFF, then program execution goes to the foregoing block $P_{36}$ to execute spark ignition control and fuel injection control in the normal mode. Alternatively, if the starter switch is ON in spite of the absence of either or both of the crank reference signal $S_1$ and the crank position signal $S_2$, the flag FCR is set to "1" at a block $P_{41}$.

After the block $P_{41}$ or after a "YES" answer at block $P_{39}$, the engine speed N is approximated based on the pulsatile variation of the air flow meter signal $S_Q$, at a block $P_{42}$. Thereafter, spark ignition timing and dwell and fuel injection amount and timing is determined on the basis of the approximated engine speed N, at a block $P_{43}$. Then, the mode selection registers -E and -F 4008-4 and 4008-5 are respectively set to MODE 2 and 4, i.e., fail-safe mode, at a block $P_{44}$. In the fail-safe mode, the register -C and -D are respectively set to $M_1$ and $N_1$ and the registers -I and -J 4008-11 and 4008-13 are respectively set to $M_2$ and $N_2$.

As will be appreciated, the register values $M_1$ and $N_1$, in combination, define a pulse of the ignition signal $S_9$. The register values $M_1$ and $N_1$ are respectively compared with the counter value as the counter counts the pulses from the clock generator 4008-1, in the comparator 4008-3. The comparator 4008-3 produces a pulse train serving as the ignition signal $S_9$ based on the result of the above comparison operation in MODE 2. On the other hand, the register values $M_2$ and $N_2$, in combination, define the fuel injection pulse width and interval. The register values $M_2$ and $N_2$ are respectively compared with the counter value to produce the pulse train serving as the fuel injection pulse $S_{20}$ in MODE 4. The values $M_1$ and $N_1$ are determined on the basis of the ignition timing determined at the block $P_{43}$ and the values $M_2$ and $N_2$ are determined on the basis of the fuel injection amount and timing determined at the block $P_{43}$.

After the blocks $P_{38}$ and $P_{44}$, the CPU 4002 executes some other routine before executing the routine of FIG. 47 again.

As disclosed hereabove, according to the present invention, temporary engine control, e.g., fuel injection control, the spark ignition control or the like, on a fail-safe basis can be performed even when the crank angle sensor fails. Thus, the engine will not stall when the fail-safe operation is required due to failure of the crank angle sensor.

Although the invention has been explained in detail with reference to the specific embodiments of the invention, the invention can be embodied otherwise in many ways without departing from the principle thereof. Moreover, although the specific embodiments are directed to applications of the fail-safe system of the invention to the ignition control and fuel injection control, the fail-safe system may be applied to any other engine control using the crank angle sensor signal or engine speed parmeter as control parameters.

What is claimed is:
1. A fail-safe system for an engine control system for an internal combustion engine, comprising:
  a crank angle sensor for detecting engine revolution and producing a crank reference signal and a crank position signal, each having a frequency proportional to the engine revolution speed;
  a control unit receiving said crank reference signal and said crank position signal and producing a control signal for controlling engine operation on the basis of said crank reference signal, said crank position signal and at least one preselected control parameter;

first means for detecting the absence of at least one of said crank reference signal and said crank position signal and producing a fault signal when the absence of at least one of said signals is detected; and second means, responsive to said fault signal, for producing a fail-safe signal for controlling said engine operation as a replacement of said control signal, said second means determining a characteristic value of said fail-safe signal on the basis of said at least one preselected control parameter.

2. A fail-safe system for an engine control system for an internal combustion engine, comprising:

a crank angle sensor for detecting engine revolution and producing a crank reference signal and a crank position signal, each indicative of an angular position of a crank shaft;

a control unit receiving said crank reference signal and said crank position signal and producing a pulse-form control signal for controlling engine operation on the basis of said crank reference signal, said crank position signal and at least one preselected control parameter;

first means for detecting an engine operating condition and the absence of at least one of said crank reference signal and said crank position signal and producing a fault signal when the absence of one of said signals is detected and the engine operating condition indicates that the engine is running; and second means, responsive to said fault signal, for producing a pulse-form fail-safe signal for controlling engine operation as a replacement of said control signal, a characteristic value of said fail-safe signal being determined in accordance with the at least one preselected control parameter.

3. A fail-safe system for an engine control system for an internal combustion engine, comprising:

a crank angle sensor for detecting engine revolution and producing a crank reference signal and a crank position signal, each having a frequency proportional to engine revolution speed;

an engine load detector for detecting the load condition on the engine and producing an engine load signal having a value proportional to the detected engine load;

a control unit receiving said crank reference signal and said crank position signal and producing a control signal for controlling engine operation on the basis of said crank reference signal, said crank position signal, said engine load condition signal value and at least one preselected control parameter;

first means for detecting the absence of at least one of said crank reference signal and said crank position signal and producing a fault signal when the absence of at least one of said signals is detected; and second means, responsive to said fault signal, for producing a fail-safe signal for controlling said engine operation as a replacement of said control signal, said second means determining said fail-safe signal value depending upoon the at least one preselected control parameter including said engine load signal value.

4. A fail-safe system for an engine control system for an internal combustion engine, comprising:

a crank angle sensor for detecting engine revolution and producing a crank reference signal and a crank position signal, each having a frequency proportional to an engine revolution speed;

a control unit receiving said crank reference signal and said crank position signal and producing a control signal for controlling engine operation on the basis of said crank reference signal, said crank position signal and at least one preselected control parameter;

first means for detecting the absence of at least one of said crank reference signal and said crank position signal and producing a fault signal when the absence of at least one of said signals is detected;

second means, responsive to said fault signal, for producing a fail-safe signal for controlling said engine operation as a replacement of said control signal, said fail-safe signal having a characteristic value derived on the basis of said at least one preselected control parameter; and third means, receiving said control signal and said fail-safe signal, for selectively outputting one of said control signal and said fail-safe signal, said third means outputting said fail-safe signal in response to said fault signal and outputting said control signal otherwise.

5. The fail-safe system as set forth in claims 1, 2, 3, or 4, which further comprises a starter switch for producing a starter signal when it is turned ON, which starter signal serves as said at least one preselected control parameter in the determination of said fail-safe signal value.

6. The fail-safe system as set forth in claims 1, 2, 3 or 4, which further comprises a knocking sensor for outputting a knocking signal when it detects engine knocking exceeding a given threshold, which knocking signal serves as said at least one preselected control parameter in the determination of said fail-safe signal.

7. The fail-safe system as set forth in claim 5, wherein said fail-safe signal value is variable between first and second values depending respectively on the presence and absence of said starter signal, said first value of said fail-safe signal being produced in response to the presence of said starter signal and the second value of said fail-safe signal being produced in response to the absence of said starter signal.

8. The fail-safe system as set forth in claim 6, wherein said fail-safe signal is variable between first and second values depending upon an engine knocking condition, said first value of said fail-safe signal being produced in response to said knocking signal and said second value of said fail-safe signal being produced otherwise.

9. The system as set forth in claims 1, 2, 3 or 4, which further comprises an engine speed detector for measuring the revolution speed of the engine without reference to said crank angle sensor signals, which engine speed detector produces an engine speed signal serving as said at least one preselected control parameter in the determination of said fail-safe signal value.

10. The system as set forth in claim 9, wherein said engine speed detector approximates said engine speed on the basis of the variation of an intake air flow rate sensor signal value which varies in synchronism with the engine revolution.

11. The system as set forth in claim 9, wherein said engine speed detector measures said engine speed on the basis of the variation of a power supply voltage.

12. The system as set forth in any one of claims 1 to 4, which further comprises a fault indicator responsive to said fault signal for indicating malfunction of said crank angle sensor.

13. The system as set forth in claim 12, which further comprises a memory for storing fault data in response to said fault signal.

14. The system as set forth in claim 13, wherein said memory is a non-volatile memory.

15. A fail-safe system for a spark ignition control system for an internal combustion engine, comprising:
- a crank angle sensor for detecting engine revolution and producing a crank reference signal and a crank position signal, each having frequencies proportional to engine revolution speed;
- a spark ignition control unit for determining a spark ignition timing based on said crank reference signal, crank position signal, and at least one preselected parameter and producing an ignition control signal for controlling the spark ignition timing;
- first control mean for detecting the absence of at least one of said crank reference signal and said crank position signal and producing a fault signal when the absence of one of said signals is detected; and
- second means, responsive to said fault signal, for producing a fail-safe signal for controlling said spark ignition timing as a replacement of said ignition control signal, said second means producing a characteristic property of said fail-safe signal on the basis of said at least one preselected parameter.

16. A fail-safe system for a spark ignition control system for an internal combustion engine, comprising:
- a crank angle sensor for detecting engine revolution and producing a crank reference signal and a crank position signal, each having frequencies proportional to engine revolution speed;
- a spark ignition control unit for determining a spark ignition timing based on said crank reference signal, crank position signal, and at least one preselected parameter and producing an ignition control pulse signal for controlling the spark ignition timing;
- first control means for detecting an engine operating condition and the absence of at least one of said crank reference signal and said position signal, and producing a fault signal when the absence of one of said signals is detected and the engine operating condition indicates that the engine is running; and
- second means, responsive to said fault signal, for producing a fail-safe pulse signal for controlling said spark ignition timing as a replacement of said ignition control signal, said fail-safe pulse signal having a characteristic property being variably dependent upon said at least one preselected parameter.

17. A fail-safe system for a spark ignition control system for an internal combustion engine, comprising:
- a crank angle sensor for detecting engine revolution and producing a crank reference signal and a crank position signal, each having frequencies proportional to engine revolution speed;
- a spark ignition control unit for determining a spark ignition timing based on said crank reference signal, crank position signal, and at least one preselected parameter and producing an ignition control signal for controlling the spark ignition timing;
- first control means for detecting the absence of at least one of said crank reference signal and said crank position signal and producing a fault signal when the absence of one of said signals is detected;
- second means, responsive to said fault signal, for producing a fail-safe signal for controlling said spark ignition timing as a replacement of said ignition control signal, a characteristic property of said fail-safe signal being derived in accordance with the at least one preselected parameter; and
- third means for receiving said ignition control signal and said fail-safe signal and selectively outputting one of said igniton control signal and said fail-safe signal, said third means outputting said fail-safe signal in response to said fault signal and outputting said ignition control signal otherwise.

18. A fail-safe system for a spark ignition control system for an internal combustion engine, comprising:
- a crank angle sensor for detecting engine revolution and producing a crank reference signal and a crank position signal, each having frequencies proportional to engine revolution speed;
- a load detector for detecting the load condition on the engine and producing an engine load signal having a value representative of the detected engine load;
- a spark ignition control unit for determining a spark ignition timing based on said crank reference signal, crank position signal, said engine load signal value, and at least one preselected parameter and producing an ignition control signal for controlling the spark ignition timing;
- first control means for detecting the absence of at least one of said crank reference signal and said crank position signal and producing a fault signal when the absence of one of said signals is detected;
- second means, responsive to said fault signal, for producing a fail-safe signal for controlling said spark ignition timing as a replacement of said ignition control signal, said second means deriving a characteristic property of said fail-safe signal on the basis of said at least one preselected parameter and said engine load value; and
- third means for selectively outputting one of said ignition control signal and said fail-safe signal depending on an operating condition of said ignition control system, said third means outputting said fail-safe signal in response to said fault signal and outputting said ignition control signal otherwise.

19. The fail-safe system as set forth in any one of claims 15 to 18, which further comprises a starter switch for producing a starter signal when it is turned ON, which starter signal serves as said at least one preselected parameter in the determination of said fail-safe signal value.

20. The fail-safe system as set forth in any one of claims 15 to 18, which further comprises a knocking sensor for detecting a knocking signal when it detects engine knocking exceeding a given threshold, which knocking signal serves as said at least one preselected parameter in the determination of said fail-safe signal.

21. The fail-safe system as set forth in claim 19, wherein said fail-safe signal characteristic property is variable between first and second values depending on the presence and absence of said starter signal, said first value of said fail-safe signal characteristic property being produced in response to said starter signal and said second value of said fail-safe signal characteristic property being produced otherwise.

22. The fail-safe system as set forth in claim 20, wherein said fail-safe signal characteristic property is variable between first and second values depending upon the engine knocking condition, said first value of said fail-safe signal characteristic property being produced in response to said knocking signal and said second value of said fail-safe signal characteristic property produced otherwise.

23. The system as set forth in any one of claims 15–18, which further comprises an engine speed detector for measuring the revolution speed of the engine without reference to said crank angle sensor signals, said engine speed detector producing an engine speed signal serving as said at least one preselected control parameter in the determination of said fail-safe signal characteristic property.

24. The system as set forth in claim 23, wherein said engine speed detector measures said engine speed on the basis of the a variation of an intake air flow rate sensor signal value which is variable in synchronism with the engine revolution.

25. The system as set forth in claim 23, wherein said engine speed detector measures said engine speed on the basis of the a variation of a power supply voltage in synchronism with the engine revolution.

26. The system as set forth in any one of claims 15 to 18, which further comprises a fault indicator responsive to said fault signal for indicating malfunction of said crank angle sensor.

27. The system as set forth in claim 26, which further comprises a memory for storing fault data in response to said fault signal.

28. The system as set forth in claim 27, wherein said memory is a non-volatile memory.

29. The system as set forth in either of claims 17 or 18, wherein said third means comprises first and second AND gates, said first AND gate receiving said fault signal in inverted form at one input terminal and said ignition control signal at the other input terminal, and said second AND gate receiving said fault signal at one input terminal and said fail-safe signal at the other input terminal.

30. The system as set forth in claim 29, wherein said second means comprises an oscillator which produces fail-safe signal pulses at a frequency variable in accordance with an input signal representative of an engine operating condition, said characteristic property being the frequency of said pulses and at least one preselected parameter being said engine operating condition.

31. The system as set forth in claim 30, wherein said oscillator varies its output pulse frequency from a first higher frequency to a second lower frequency in response to a signal from a starter.

32. The system as set forth in claim 31, wherein said oscillator varies its output pulse frequency from a first higher frequency to a second lower frequency in response to a knocking signal produced when harmful engine knocking is detected.

33. The system as set forth in either of claims 17 or 18, wherein said third means is a mode selector incorporated in an interface of said ignition control unit, which mode selector is operable between a first normal mode and a second fail-safe mode, and said second means comprises first and second sets of registers incorporated in said interface, a clock generator for producing clock pulses at a constant frequency, a counter for selectably counting said crank position signals or said clock pulses depending on the operational mode selected by said mode selector, and a comparator for comparing said counter value of said counter to the register values of one of said first and second sets of registers, said mode selector being responsive to said fault signal for switching the operational mode from said first mode to said second mode, and said counter counting said clock pulses and said comparator comparing the counter value to said second set of register values in said second mode, and said counter counting said crank position signals and said comparator comparing the counter value to said first set of register values in said first mode.

34. The system as set forth in either of claims 17 or 18, wherein said second means is a clock generator connected to an interface of said ignition control unit, and said third means is a switch adapted to selectably connect one of said crank angle sensor and said clock generator to said interface, said switch being responsive to said fault signal to connected said clock generator to said interface and, otherwise to connect said crank angle sensor to said interface.

35. A fail-safe system for a fuel injection control system for a fuel injection internal combustion engine, comprising:

a crank angle sensor for detecting engine revolution and producing a crank reference signal and a crank position signal, each having frequencies proportional to engine revolution speed;

a fuel injection control unit for determining a fuel injection amount based on said crank references signal, said crank position signal and at least one preselected control parameter and producing a fuel injection control signal having a value representative of the determined fuel injection amount;

first means for detecting the absence of at least one of said crank reference signal and said crank position signal and producing a fault signal when absence of one of said signals is detected; and second means, responsive to said fault signal, for producing a fail-safe signal for controlling the fuel injection amount as a replacement of said fuel injection signal, a value of said fail-safe signal being variable depending upon said at least one preselected control parameter.

36. A fail-safe system for a fuel injection control system for a fuel injection internal combustion engine comprising:

a crank angle sensor for detecting engine revolution and producing a crank reference signal and a crank position signal, each having frequencies proportional to engine revolution speed;

a load detector for detecting the load condition on the engine and producing an engine load signal having a value representative of the detected engine load;

a fuel injection control unit for determining a fuel injection amount based on said crank reference signal, said crank position signal, said engine load signal and said at least one preselected control parameter and producing a fuel injection control signal having a value representative of the determined fuel injection amount;

first means for detecting the absence of at least one of said crank reference signal and said crank position signal and producing a fault signal when the absence of one of said signals is detected; and second means, responsive to said fault signal, for producing a fail-safe signal for controlling the fuel injection amount as a replacement of said fuel injection signal, said second means deriving a value of said fail-safe signal on the basis of the preselected control parameters.

37. A fail-safe system for a fuel injection control system for a fuel injection internal combustion engine, comprising:
- a crank angle sensor for detecting engine revolution and producing a crank reference signal and a crank position signal, each having frequencies proportional to engine revolution speed;
- a load detector for detecting the load condition on the engine and producing an engine load signal having a value representative of the engine load;
- a fuel injection control unit for determining a fuel injection amount based on said crank reference signal, said crank position signal, said engine load signal and at least one preselected control parameter and producing a fuel injection control signal having a value representative of the determined fuel injection amount;
- first means for detecting the absence of at least one of said crank reference signal and said crank position signal and producing a fault signal when the absence of one of said signals is detected;
- second means, responsive to said fault signal, for producing a fail-safe signal for controlling the fuel injection amount as a replacement of said fuel injection signal, said second means deriving a value of said fail-safe signal on the basis of said at least one preselected control parameter; and
- third means for selectively outputting one of said fuel injection control signal and said fail-safe signal depending upon the condition of the control system, said third means outputting said fail-safe signal in response to said fault signal and outputting said fuel injection control system otherwise.

38. The system as set forth in claim 35, which further comprises a load detector for detecting the load condition on the engine and producing an engine load signal having a value proportional to said engine load.

39. The system as set forth in any one of claims 35 to 38, wherein said second means determines the fail-safe signal value depending upon the load condition of the engine to produce a first larger value of said fail-safe signal when said engine load is smaller than a predetermined threshold, and a second smaller value of said fail-safe signal when said engine load is larger than said threshold.

40. In an engine control system for an internal combustion engine for controlling an engine operation, which system includes a crank angle sensor for producing a crank reference signal and a crank position signal, a control unit for performing a control operation based on at least one preselected engine control parameter, a method for performing a fail-safe operation when said crank angle sensor fails to produce at least one of said crank reference signal and said crank position signal, comprising the steps of:
- detecting the presence of said crank reference signal and said crank position signal and producing a fault signal when at least one of said signals is absent;
- producing a fail-safe signal in response to said fault signal;
- varying a value of said fail-safe signal in response to said at least one preselected engine control parameter; and
- replacing a control signal produced in said control unit with said fail-safe signal for performing temporary engine control operation.

41. In an engine control system for an internal combustion engine for controlling an engine operation, which system includes a crank angle sensor for producing a crank reference signal and a crank position signal, a control unit for performing a control operation based on at least one preselected engine control parameter, a method for performing a fail-safe operation when said crank angle sensor fails to produce at least one of said crank reference signal and said crank position signal, comprising the steps of:
- detecting said crank reference signal and said crank position signal;
- producing a fault signal in the absence of at least one of said crank reference signal and said crank position signal;
- producing a fail-safe signal with a given frequency in response to said fault signal, said given frequency being variable depending upon said at least one preselected control parameter; and
- replacing a control signal produced by said control unit with said fail-safe signal in response to said fault signal to perform engine control operation.

42. In a spark ignition control system for an internal combustion engine for controlling a spark ignition timing, which system includes a crank angle sensor for producing a crank reference signal and a crank position signal and a control unit for producing an ignition control signal based on at least one predetermined control parameter including said crank reference signal and said crank position signal, a method for performing fail-safe operation when the crank angle sensor fails, comprising the steps of:
- sequentially detecting said crank reference signal and said crank position signal;
- producing a fault signal when the absence of one of said crank reference signal and crank position signal is detected;
- producing a fail-safe signal with a given frequency variably dependent upon said at least one predetermined control parameter in response to said fault signal; and
- replacing said ignition control system with said fail-safe signal in response to said fault signal to temporarily perform the ignition control operation.

43. In a fuel injection control system for an internal combustion engine for controlling a fuel injection, which system includes a crank angle sensor for producing a crank reference signal and a crank position signal, a control unit for producing a fuel injection signal based on at least one predetermined control parameter including said crank reference signal and said crank position signal, a method for performing fail-safe operation when the crank angle sensor fails, comprising the steps of:
- detecting said crank reference signal and said crank position signal;
- producing a fault signal when at least one of said crank reference signal or said crank position signal is absent;
- producing a fail-safe signal with a given frequency variable in accordance with said at least one predetermined control parameter in response to said fault signal; and replacing said fuel injection control signal with said fail-safe signal in response to said fault signal to temporarily perform fuel injection.

44. The method as set forth in any one of claims 40 to 43, in which said fault signal is produced when one of said crank reference signal and said crank position signal is absent and the engine in running.

45. The method as set forth in any one of claims 40, 41 and 42, wherein the frequency of said fail-safe signal is variable in accordance with a starter switch position.

46. The method as set forth in any one of claims 40, 41 or 42, wherein the frequency of said fail-safe signal is variable in accordance with an engine knocking condition.

47. The method as set forth in claim 40, 41 or 43, wherein the frequency of said fail-safe signal is variable in accordance with an engine load condition.

48. The method as set forth in claim 44, which further comprises a step of indicating that the system is in fail-safe operation in response to said fault signal.

49. The method as set forth in claim 48, which further comprises a step of storing fault data in a non-volatile memory each time said fault signal is produced.

50. A backup system for an automotive engine control system including a crank angle sensor producing a crank reference signal and a crank position signal, said control system deriving an engine control signal having a value determined on the basis of preselected engine control parameters including at least one of said crank reference and crank position signal, comprising:
 a first detector detecting the presence of the crank reference signal and the crank position signal and producing a first signal when at least one of said signals is absent; and
 a second detector for detecting an engine operating condition and producing a second signal when the engine operating condition indicates that the engine is running;
 means for detecting failure of the crank angle sensor to produce a fault signal when both of said first and second signals are present; and
 means responsive to said fault signal, for producing a backup signal for controlling engine operation as a replacement of said control signal, said backup signal having a value variably depending upon engine operating condition represented by the preselected engine control parameters.

51. The fault detection system as set forth in claim 50, wherein said engine operating condition is detected by detecting whether an intake air flow rate exceeds a given threshold.

52. The fault detection as set forth in either of claims 50 or 51, wherein said detector is an intake air flow meter.

53. A fail-safe system for an engine control system for an internal combustion engine, comprising:
 a crank angle sensor for detecting engine revolution and producing a crank reference signal and a crank position signal, each having a frequency proportional to the engine revolution speed;
 a control unit receiving said crank reference signal and said crank position signal and producing a control signal for controlling engine operation on the basis of said crank reference signal, said crank position signal and at least one preseleuted control parameter;
 first means for detecting the absence of at least one of said crank reference signal and said crank position signal and producing a fault signal when the absence of at least one of said signals is detected; and
 second means, responsive to said fault signal and said at least one preselected control parameter, for producing a fail-safe signal for controlling said engine operation as a replacement of said control signal.

54. A fail-safe system for an engine control system for an internal combustion engine, comprising:
 a crank angle sensor for detecting engine revolution and producing a crank reference signal and a crank position signal, each indicative of an angular position of a crank shaft;
 a control unit receiving said crank reference signal and said crank position signal and producing a pulse-form control signal for controlling engine operation on the basis of said crank reference signal, said crank position signal and at least one preselected control parameter;
 first means for detecting an engine operating condition and the absence of at least one of said crank reference signal and said crank position signal and producing a fault signal when the absence of one of said signals is detected and the engine operating condition indicates that the engine is running; and
 second means, responsive to said fault signal and said at least one preselected control parameter, for producing a pulse-form fail-safe signal for controlling engine operation as a replacement of said control signal.

55. A fail-safe system for an engine control system for an internal combustion engine, comprising:
 a crank angle sensor for detecting engine revolution and producing a crank reference signal and a crank position signal, each having a frequency proportional to engine revolution speed;
 an engine load detector for detecting the load condition on the engine and producing an engine load signal having a value proportional to the detected engine load;
 a control unit receiving said crank reference signal and said crank position signal and producing a control signal for controlling engine operation on the basis of said crank reference signal, said crank position signal, said engine load condition signal value and at least one preselected control parameter;
 first means for detecting the absence of at least one of said crank reference signal and said crank position signal and producing a fault signal when the absence of at least one of said signals is detected; and
 second means, responsive to said fault signal and said at least one preselected control parameter for producing a fail-safe signal for controlling said engine operation as a replacement of said control signal.

56. A fail-safe system for an engine control system for an internal combustion engine, comprising:
 a crank angle sensor for detecting engine revolution and producing a crank reference signal and a crank position signal, each having a frequency proportional to an engine revolution speed;
 a control unit receiving said crank reference signal and said crank position signal and producing a control signal for controlling engine operation on the basis of said crank reference signal, said crank position signal and at least one preselected control parameter;
 first means for detecting the absence of at least one of said crank reference signal and said crank position signal and producing a fault signal when the absence of at least one of said signals is detected;

second means, responsive to said fault signal and said at least one preselected control parameter, for producing a fail-safe signal for controlling said engine operation as a replacement of said engine control; and third means, receiving said control signal and said fail-safe signal, for selectively outputting one of said control signal and said fail-safe signal, said third means outputting said fail-safe signal in response to said fault signal and outputting said control signal otherwise.

* * * * *